(12) United States Patent
Guo et al.

(10) Patent No.: US 12,009,710 B2
(45) Date of Patent: Jun. 11, 2024

(54) STAMPING PROGRESSIVE DIE FOR STATOR AND ROTOR CORE OF MOTOR USING ADHESIVE DISPENSING LAMINATION, AND ADHESIVE DISPENSING PROCESS

(71) Applicant: Jiangyin Huaxin Precision Technology Co., Ltd., Wuxi (CN)

(72) Inventors: Bin Guo, Wuxi (CN); Yicun Zhou, Wuxi (CN); Dawei Liu, Wuxi (CN); Laiyuan Zhao, Wuxi (CN)

(73) Assignee: Jiangyin Huaxin Precision Technology Co., Ltd., Wuxi (CN)

( * ) Notice: Subject to any disclaimer, the term of this patent is extended or adjusted under 35 U.S.C. 154(b) by 0 days.

(21) Appl. No.: 18/550,956

(22) PCT Filed: Mar. 3, 2023

(86) PCT No.: PCT/CN2023/079451
§ 371 (c)(1),
(2) Date: Sep. 16, 2023

(87) PCT Pub. No.: WO2023/169312
PCT Pub. Date: Sep. 14, 2023

(65) Prior Publication Data
US 2024/0146159 A1    May 2, 2024

(30) Foreign Application Priority Data
Mar. 9, 2022    (CN) .......................... 202210230453.8

(51) Int. Cl.
*H02K 15/02*    (2006.01)
*H02K 15/12*    (2006.01)

(52) U.S. Cl.
CPC ............. *H02K 15/02* (2013.01); *H02K 15/12* (2013.01); *H02K 2201/09* (2013.01); *H02K 2215/00* (2021.08); *Y10T 29/49009* (2015.01)

(58) Field of Classification Search
CPC ....... H02K 15/02; H01F 27/245; H01F 27/25; H01F 3/04; H01F 41/0213; Y10T 29/49009
(Continued)

(56) References Cited

U.S. PATENT DOCUMENTS

| 9,531,223 B2* | 12/2016 | Blocher .............. B32B 38/0036 |
| 11,355,282 B2* | 6/2022 | Okudaira ............ H01F 41/0206 |
| 2015/0202856 A1 | 7/2015 | Hirata et al. |

FOREIGN PATENT DOCUMENTS

| CN | 107533907 A | 1/2018 |
| CN | 109079031 A | 12/2018 |

(Continued)

OTHER PUBLICATIONS

International Search Report, issued in PCT/CN2023/079451, dated May 14, 2023.
(Continued)

*Primary Examiner* — Thiem D Phan
(74) *Attorney, Agent, or Firm* — Zhu Lehnhoff LLP

(57) ABSTRACT

A stamping progressive die for a stator and rotor core of a motor using adhesive dispensing lamination and an adhesive dispensing process. The adhesive dispensing lamination device comprises a stamping station, an adhesive dispensing station for a first adhesive component, an adhesive dispensing station for a second adhesive component and a blanking station which are arranged on the stamping progressive die for the core of the stator and rotor of the motor, wherein an automatic stacking mechanism for core stamping sheets is arranged below the blanking station; one of the adhesive
(Continued)

dispensing station for the first adhesive component and the adhesive dispensing station for the second adhesive component is located at an upper position of a material strip, and the other adhesive dispensing station is located at a lower position of the material strip.

10 Claims, 7 Drawing Sheets

(58) Field of Classification Search
USPC ...... 29/596, 417, 592.1, 602.1, 603.14, 607, 29/609
See application file for complete search history.

(56) References Cited

FOREIGN PATENT DOCUMENTS

| CN | 112719100 | A | 4/2021 |
|---|---|---|---|
| CN | 113245119 | A | 8/2021 |
| CN | 113346689 | A | 9/2021 |
| CN | 114785060 | A | 7/2022 |
| JP | H11308823 | A | 11/1999 |
| JP | 2001321850 | A | 11/2001 |
| JP | 2003257761 | A | 9/2003 |
| JP | 2006026735 | A | 2/2006 |
| JP | 2011082584 | A | 4/2011 |
| WO | 2015190679 | A1 | 12/2015 |
| WO | 2016200024 | A1 | 12/2016 |

OTHER PUBLICATIONS

Written Opinion, issued in PCT/CN2023/079451, dated May 14, 2023.
First Examination Report, issued in Chinese priority application (App No. 202210230453.8), dated Nov. 29, 2022.
Response to First Examination Report, issued in Chinese priority application (App No. 202210230453.8), dated Nov. 29, 2022.
Notice of Grant of Patent Rights, issued in Chinese priority application (App No. 202210230453.8), dated Feb. 6, 2023.

* cited by examiner

STAMPING PROGRESSIVE DIE FOR STATOR AND ROTOR CORE OF MOTOR USING ADHESIVE DISPENSING LAMINATION, AND ADHESIVE DISPENSING PROCESS

TECHNICAL FIELD

The present invention relates to the technical field of manufacturing a stator and rotor core of a motor for a new energy electric vehicle and a precision motor stator and rotor core with a high requirement for motor performance, and particularly relates to a stamping progressive die for stator and rotor core of a motor using adhesive dispensing lamination, and an adhesive dispensing process.

BACKGROUND ART

The stator and rotor core of a motor includes a motor stator core and a motor rotor core, both of which are formed by laminating silicon steel sheets (stamping sheets). The silicon steel sheets are usually stamped on a press using a stamping progressive die. Generally, an upper die plate, a lower die plate and a discharge plate located between the upper die plate and the lower die plate are provided on the stamping progressive die. A plurality of male dies are mounted on the upper die plate, and a female die adapted to the male die is mounted on the corresponding position of the lower die plate, so as to form a plurality of punching stations. During stamping, a material strip moves forward in a stepwise manner from between the upper die plate and the lower die plate. Through holes, tooth grooves and inner contours on a motor stator core stamping sheet are punched successively via the stamping dies (male dies and female dies) at each station. Finally, the core stamping sheet is stamped from the material strip via the blanking male dies and blanking female dies at the blanking station. In order to achieve automatic stacking of the core stamping sheets, an automatic stacking die is mounted below a blanking female die of the stamping progressive die. The main component of the automatic stacking die is a tightening ring for accommodating the core stamping sheets and having an interference fit with the core stamping sheets. During the blanking, the core stamping sheets which are punched out are pressed one by one into the tightening ring under the action of the downward punching pressure of the blanking male die, thereby forming a laminated structure of the core stamping sheets in the tightening ring.

In the prior art, it is common to fix the laminated structure of the core stamping sheets by riveting and welding. A riveting point is stamped on the core stamping sheet in a riveting manner. During the stacking, two adjacent core stamping sheets are combined with each other via the riveting point thereon. There is no riveting point on the core stamping sheet in a welding manner. During the stacking, two adjacent motor stator core stamping sheets are joined together by welding.

Due to the existence of the riveting point and the manufacturing process, the stator core of the motor after riveting may have a certain gap between two adjacent stamping sheets after riveting, thus affecting the magnetic properties of the core. Due to the elimination of the riveting point, the gap between two adjacent stamping sheets of the core stamping sheet in the welding and fixing manner is reduced. However, the core magnetic circuit is affected due to the inward fusion welding of the core, then affecting the electromagnetic performance of the core, thereby reducing the efficiency of the produced motor, and thus increasing the energy consumption of the motor.

For this reason, the prior art also has developed a core using an adhesive joint fixing manner. The specific implementation method includes the following steps. An adhesive dispensing station is provided on a stamping progressive die. The adhesive dispensing station is provided with an adhesive dispensing device including a plurality of adhesive supply nozzles. When a material strip passes through the adhesive dispensing station, the adhesive is coated on one side of the material strip via the adhesive supply nozzles. During the blanking, the core stamping sheets enter into the tightening ring. The upper and lower adjacent core stamping sheets are laminated and fixed together by the adhesive. However, the above-mentioned adhesive dispensing lamination technology in the prior art also has the following disadvantages.

1. Due to the long curing time of the adhesive, it may lead to that the curing of the core stamping sheet is not completed after the stacking in the tightening ring is completed, resulting in deformation of the core after discharging, thereby affecting the quality of the core adhesive dispensing lamination. If the stamping speed is artificially slowed to wait for the adhesive to fully cure before discharging the core from the tightening ring, the efficiency of the stamping production will be greatly reduced.

2. The pneumatic adhesive supply is provided in the existing adhesive supply system of the adhesive dispensing device, which is easy to cause instability of air pressure in the process of adhesive dispensing, so that the amount of adhesive dispensing on the core is not easy to control, the amount of adhesive dispensing is too small, and the core is not firmly bonded, affecting the core assembly and use. When the amount of adhesive is too much, the adhesive is easy to overflow and not easy to be cleaned. On the one hand, it will affect the appearance of core and the later assembly. On the other hand, it will also affect the magnetic properties of core to a certain extent.

3. The adhesive feeding channel and the nozzle (adhesive dispensing outlet) on the adhesive dispensing device are easy to be blocked or contaminated during use, and the cleaning and maintenance thereof are troublesome after the blocking or contamination, thereby also affecting the efficiency of stamping production.

4. There may be oil stain on the surface of the sheet material used for producing the core stamping sheet. In addition, when the sheet material passes through the progressive die of the punching machine, the lubricating oil on the punching machine and the progressive die may contaminate the surface of the sheet material, thereby reducing the firmness of the bonding after lamination of the core stamping sheet, thereby reducing the quality of the core.

5. The ambient temperature of the stamping workshop used for manufacturing the core may change, especially in the cold winter. As too low a temperature may slow down the curing speed of the adhesive, it thereby greatly reduces the efficiency of the stamping production and possibly affects the strength of the curing.

SUMMARY OF THE INVENTION

In order to solve the above-mentioned problems, the present invention proposes a stamping progressive die for a stator and rotor core of a motor using adhesive dispensing lamination and an adhesive dispensing process, so as to improve the quality and production efficiency of the adhesive dispensing lamination of the stator and rotor core of the motor, thereby improving the efficiency of the motor and reducing the energy consumption of the motor. The specific technical solution is as follows.

A stamping progressive die for a stator and rotor core of a motor using adhesive dispensing lamination comprises a stamping station, an adhesive dispensing station for a first adhesive component, an adhesive dispensing station for a second adhesive component and a blanking station which are successively arranged on the stamping progressive die for the stator and rotor core of the motor according to the moving direction of a material strip, wherein an automatic stacking mechanism for core stamping sheets is arranged below the blanking station; one of the adhesive dispensing station for the first adhesive component and the adhesive dispensing station for the second adhesive component is located at an upper position of the material strip, and the other adhesive dispensing station is located at a lower position of the material strip; wherein an adhesive dispensing device for a first adhesive component for dispersing and dispensing a first adhesive component to one side of the material strip is arranged at the adhesive dispensing station for the first adhesive component; an adhesive dispensing device for a second adhesive component for dispersing and dispensing a second adhesive component to the other side of the material strip is arranged at the adhesive dispensing station for the second adhesive component; each adhesive dispensing position arranged on one side of the material strip by the adhesive dispensing device for the first adhesive component and each adhesive dispensing position arranged on the other side of the material strip by the adhesive dispensing device for the second adhesive component are arranged opposite to each other in an up-down direction.

Preferably, in the first adhesive component and the second adhesive component, the adhesive of one of the components is the main adhesive, and the adhesive of the other component is a catalyst for promoting the curing of the main adhesive.

The automatic stacking mechanism for the core stamping sheets comprises an automatic stacking die which is a rotary core lamination pressing die; the rotary core lamination pressing die is provided with a tightening ring in an interference fit with an outer edge of the core stamping sheet, and the tightening ring is driven by a servo motor to realize that the rotation angle of the tightening ring is changeable; the automatic stacking mechanism for the core stamping sheets further comprises a servo pressure discharge system arranged below the automatic stacking die for applying a jacking force to the core in the rotary core lamination pressing die; the servo pressure discharge system comprises a servo electric cylinder arranged below the tightening ring, and a rotatable floating inductive jacking assembly arranged on an upper end of a telescopic rod of the servo electric cylinder; and the rotatable floating inductive jacking assembly comprises a jacking tray rotatably arranged on the telescopic rod of the servo electric cylinder and capable of floating up and down at a certain distance, and a displacement sensor for monitoring a floating up or down position of the jacking tray arranged on a telescopic rod of the servo electric cylinder and below the jacking tray.

Preferably, the displacement sensor is a non-contact distance sensitive sensor.

The rotatable floating inductive jacking assembly further comprises a support seat ring fixed on an upper end of the telescopic rod of the servo electric cylinder and a central positioning through-hole arranged on the support seat ring; a positioning shaft is arranged at a lower end of the jacking tray, and the jacking tray is rotatably arranged on the central positioning through-hole of the support seat ring via the positioning shaft; a planar thrust bearing is arranged on an upper portion of the support seat ring; a spring ring is further sleeved on the positioning shaft of the jacking tray; the spring ring is located between a lower end surface of the jacking tray and an upper end surface of the planar thrust bearing; a compression spring for floating and tightening the jacking tray is arranged between the jacking tray and the spring ring; during the blanking, under the action of a blanking die at a blanking station, each core stamping sheet is successively extruded into the tightening ring of the automatic stacking die to achieve the lamination of each core stamping sheet, and the main adhesive and the catalyst located at each position point between upper and lower adjacent core stamping sheets in the tightening ring are in mutually facing contact, so that the main adhesive is accelerated to solidify, thereby bonding the upper and lower adjacent core stamping sheets firmly to form a core; and when the core stamping sheets are stacked, accurate stacking of the core stamping sheets is achieved by the servo pressure discharge system, thereby forming a core having a desired overall height dimension.

Once the core stamping sheet located on the blanking station is blanked, the telescopic rod of the servo electric cylinder descends by a distance of the thickness of the core stamping sheet, so as to ensure that after each blanking, the jacking tray on the telescopic rod always simultaneously jacks against the lower end face of the core in the tightening ring.

The servo electric cylinder is connected to a controller.

Preferably, the controller is a PLC controller.

In the above-mentioned servo pressure discharge system, the servo electric cylinder is used as the driving element of the jacking core, which has the advantages of compact structure, no oil pollution and fast and controllable reaction compared with the hydraulic jacking cylinder.

The servo pressure discharge system achieves accurate lamination of the core stamping sheets, including the steps of:

S1, initial setting of jacking tray positions: when the inside of the tightening ring is empty, arranging the jacking tray at a predetermined height position by adjusting the upper and lower positions of the telescopic rod of the servo electric cylinder, wherein the predetermined height position of the jacking tray needs to ensure that the jacking tray is in elastic floating contact with the core stamping sheet after the first core stamping sheet blanks into the tightening ring;

S2, precise presetting of jacking tray positions: monitoring the distance between a lower end face of the jacking tray and an upper end face of the spring ring by a distance induction sensor at an upper end of the telescopic rod of the servo electric cylinder after the first core stamping sheet blanks into the tightening ring, and then adjusting the upper and lower positions of the telescopic rod of the servo electric cylinder, so that the distance between the lower end face of the jacking tray and the upper end face of the spring ring is exactly equal to the distance of the thickness of one core stamping sheet;

S3, transposition setting of the tightening ring: according to the equal division condition of the groove body or the hole on the core stamping sheet, rotating a rotary body containing the tightening ring by a certain equal division angle by means of a rotary core lamination pressing die; and S4, blanking lamination: under the action of the punching pressure of the blanking die at the blanking station, extruding the core stamping sheet to be blanked into the tightening ring of the automatic stacking die and to be in contact with the core stamping sheet blanked previously in the tightening ring, so as to drive a lowermost core stamping sheet in the tightening ring to move downwards together; synchronously pushing the jacking tray floatingly supported on the lowermost core stamping sheet to move downwards, so that the lower end face of the jacking tray is in contact with the upper end face of the spring ring, wherein the displacement amount passed when the jacking tray moves downwards into contact with the spring ring is just equal to the distance of the thickness of one core stamping sheet, so that the gap between two adjacent core stamping sheets is eliminated, and accurate lamination is achieved; before the next blanking and stacking, based on the data measured by the distance induction sensor, actively moving the telescopic rod of the servo electric cylinder down by a distance of the thickness of the core stamping sheet; and at the same time, rotating the rotary body containing the tightening ring by a certain bisection angle by means of the rotary core lamination pressing die, so as to prepare for the next blanking and stacking.

Preferably, in order to realize the mutual nesting of the motor stator stamping and the motor rotor stamping, a motor rotor punching station group and a motor stator punching station group are successively arranged on the stamping progressive die for the stator and rotor core of the motor according to the moving direction of the material strip; a stamping station, an adhesive dispensing station for the first adhesive component, an adhesive dispensing station for the second adhesive component and a blanking station are respectively arranged on the motor rotor blanking station group and the motor stator blanking station group; and the automatic stacking mechanism for the core stamping sheets is respectively arranged below each of the blanking stations.

Preferably, the number of the stamping stations is several in order to accommodate the requirements of tooth groove punching, through hole punching and inner contour punching on the core stamping sheet; wherein each of the stamping stations is respectively provided with an upper stamping die and a lower stamping die; the blanking station is provided with an upper blanking die and a blanking die; the upper stamping die and the upper blanking die are both male dies; the lower stamping die and the blanking die are both female dies; the male dies are fixed on an upper die plate of the stamping progressive die for the stator and rotor core of the motor; the female dies are fixed on a lower die plate of the stamping progressive die for the stator and rotor core of the motor; and a discharge plate for withdrawing the male dies is further arranged on a lower end face of the upper die plate.

Preferably, where there are a plurality of stamping stations, an adhesive dispensing station for the first adhesive component may be provided at the same time on the last stamping station preceding the blanking station (stamping station for stamping the inner contour) to make the die structure more compact.

Preferably, the first adhesive component is a main adhesive with a relatively high viscosity, and the second adhesive component is a catalyst with a relatively low viscosity; and the adhesive dispensing station for the first adhesive component as a main adhesive dispensing station is located on the stamping progressive die for the stator and rotor core of the motor at a position below the material strip; and the adhesive dispensing station for the second adhesive component as a catalyst dispensing station is located on the stamping progressive die for the stator and rotor core of the motor at a position above the material strip.

Preferably, the main adhesive has a viscosity of 2000-6000 CP and the catalyst has a viscosity of 50-2500 CP at a temperature of 20° C.

More preferably, the main adhesive has a viscosity of 5000-6000 CP and the catalyst has a viscosity of 500-1000 CP at a temperature of 20° C.

The higher viscosity of the main adhesive ensures that it does not fall off when it is coated onto the lower end face of the material strip during stamping, and the lower viscosity of the catalyst facilitates contact with the main adhesive during the core stamping sheet lamination, allowing more sufficient penetration into the main adhesive after lamination, thereby improving the lamination bond strength of the core stamping sheet.

In the present invention, the adhesive dispensing device for the first adhesive component as a main adhesive dispensing device is mounted on a lower die plate of the stamping progressive die for the stator and rotor core of the motor; and the adhesive dispensing device for the second adhesive component as a catalyst dispensing device is mounted on a discharge plate of the stamping progressive die for the stator and rotor core of the motor.

In the present invention, the adhesive dispensing device for the first adhesive component and the adhesive dispensing device for the second adhesive component respectively comprise an adhesive dispensing tray and a number of adhesive dispensing nozzle bodies dispersedly arranged on the adhesive dispensing tray, wherein the adhesive dispensing nozzle bodies are provided with an adhesive feeding channel; one end of the adhesive feeding channel is an adhesive dispensing outlet, and the other end of the adhesive feeding channel is connected to an adhesive feeding pipe joint which is connected to an adhesive supply system via an adhesive feeding pipeline; the adhesive dispensing nozzle body is further provided with a washing channel; one end of the washing channel is in communication with the adhesive feeding channel, and one end of the washing channel is connected to a washing pipe joint which is connected to a cleaning liquid supply system via a washing pipeline; an adhesive solenoid valve is arranged on the adhesive feeding pipeline; and a cleaning liquid solenoid valve is arranged on the washing pipeline; wherein the adhesive supply system comprises a servo metering adhesive pump connected to the adhesive feeding pipeline.

Preferably, a servo metering adhesive pump of the adhesive supply system is a servo plunger metering pump.

In order to control the amount of adhesive dispensing more accurately, in a further improvement, each dispensing nozzle body is separately provided with a servo plunger metering pump via an adhesive feeding pipeline.

In the present invention, the washing line connecting each dispensing nozzle body is connected to the same cleaning header pipe and then to the cleaning liquid supply system.

In the present invention, the cleaning liquid supply system includes an air dryer, an air booster pump, an air accumulator, an air pressure regulating valve, and a cleaning liquid airtight pressure tank connected in sequence.

In the present invention, an outer thread is arranged on an outer circumference of one end of the adhesive dispensing nozzle body, and the adhesive dispensing nozzle body is fixed on the adhesive dispensing tray via a nut connected to the outer thread of the adhesive dispensing nozzle body.

In the present invention, the adhesive dispensing nozzle body is dispersedly arranged at intervals on the adhesive dispensing tray.

In the present invention, the adhesive dispensing tray is mounted on an adhesive dispensing station of the progressive die for the stator and rotor core of the motor; the adhesive dispensing tray may be mounted above or below the material strip; and the adhesive dispensing nozzle body of the adhesive dispensing tray has its adhesive dispensing outlet aligned with the surface of the material strip.

During the adhesive dispensing operation, the adhesive solenoid valve is in an open state, the cleaning liquid solenoid valve is in a closed state, and the adhesive is output from the adhesive dispensing outlet on the adhesive dispensing nozzle body via the adhesive supply system; during the cleaning operation, the adhesive solenoid valve is in a closed state, and the cleaning liquid solenoid valve is in an open state; and the cleaning of the adhesive feeding channel on the adhesive dispensing nozzle body is achieved via the cleaning liquid supply system.

Note that in order to prevent the cleaning liquid from contaminating the die, a moisture-absorbing cloth may be temporarily provided at the adhesive dispensing outlet of the adhesive dispensing nozzle body during the on-line washing operation.

As a further improvement of the present invention, a washing station for washing the position of each adhesive dispensing position on the material strip before the adhesive dispensing operation is further arranged after the stamping station and before the adhesive dispensing station for the first adhesive component, and a negative pressure washing device for washing the position of each adhesive dispensing position using a negative pressure adsorption principle is arranged on the washing station; the negative pressure washing device comprises a washing tray and a plurality of washing pipe assemblies dispersedly arranged on the washing tray, wherein a negative pressure chamber is provided inside the washing tray; the washing pipe assemblies comprise an outer washing pipe and an inner washing pipe coaxially sleeved with each other; a front end face of the inner washing pipe is provided with a certain amount of retraction relative to a front end face of the outer washing pipe; a rear end part of the outer washing pipe and a rear end part of the inner washing pipe are respectively fixed on the washing tray, and are in the outer washing pipe and the inner washing pipe; and the inner hole part of the rear end of one of the washing pipes is in communication with the negative pressure chamber on the washing tray, and the inner hole part of the rear end of the other washing pipe is in communication with the outside air.

According to the present invention, since a washing station is provided after the stamping station and before the adhesive dispensing station for the first adhesive component, the oil stain existing on the material strip and the oil stain generated during the stamping process may be removed together at each adhesive dispensing position by means of suction under negative pressure Thus, the occurrence of weak adhesion between the adhesive and the core stamping sheet due to the oil stain existing at the adhesive dispensing position may be avoided, thereby improving the quality of adhesive dispensing lamination of the core stamping sheet.

In the present invention, a rubber sealing ring is arranged on an end face of a front end of the outer washing pipe, and a negative pressure chamber on the washing tray is connected to a vacuumizing device via a negative pressure pipeline; and in the outer washing pipe and the inner washing pipe, an air filter surrounding the inner hole part is arranged at the periphery of the inner hole part at the rear end of the washing pipe communicating with the outside air.

Preferably, the vacuumizing device is a vacuum pump or a vacuum generator.

According to the working principle of the above-mentioned negative pressure washing device, after the material strip moves to the washing station, the front ends of each outer washing pipe located on the washing trays above and below the material strip respectively correspond to the adhesive dispensing positions on the material strip. Under the action of the vacuumizing device, external air is sucked into the inner washing pipe after being filtered by the air filter and enters the negative pressure chamber of the washing tray through the gap between the outer washing pipe and the inner washing pipe, and is finally drawn out by the vacuumizing device. In this process, the oil stain at the adhesive dispensing position on the material strip is carried away by the negative pressure air flow at the front end of the inner washing pipe directly opposite to the adhesive dispensing position on the material strip, thereby achieving the function of desmearing the adhesive dispensing position on the material strip.

In a further improvement, the inner hole of the rear end of the inner washing pipe is also provided with a laser heating head for non-contact local preheating of the surface of the adhesive dispensing position on the material strip. The surface of each adhesive dispensing position is cleaned by the above-mentioned negative pressure and locally preheated by a laser, and then the adhesive is dispensed, so as to further improve the curing speed and curing strength of the adhesive between the core stamping sheets.

By setting the laser intensity of the laser heating head and the speed of the negative pressure air flow, it is possible to control the surface temperature at the adhesive dispensing position on the material strip within a reasonable range set in advance, thereby preventing the temperature of the material strip itself from being too low to affect the curing speed after the two adhesives are mixed.

Preferably, the preheating may be performed by the laser heating head on only both sides of the material strip.

Preferably, only one side of the material strip is preheated by the laser heating head, preferably the upper face of the material strip. It transfers heat for the mixed adhesive by the heat transfer effect during the core stamping sheet lamination to increase the curing speed.

As a further improvement of the present invention, a hot air flow heating device for performing auxiliary heating on the core stamping sheet and the adhesive during lamination so as to achieve the accelerated curing of the adhesive is further arranged on the rotatable floating inductive jacking assembly of the servo electric cylinder of the servo pressure discharge system, wherein the hot air flow heating device comprises a mounting hole axially arranged at the middle part of the upper end of the jacking tray and a straight-handle heating fan arranged in the mounting hole, and a hot air outlet of the straight-handle heating fan is provided upwards; an air inlet channel which is in communication with the mounting hole is arranged on a positioning shaft of the jacking tray; an air inlet annular groove is arranged on the central positioning through-hole of the support seat ring; an outer edge surface of the support seat ring is provided with an air inlet channel which is in communication with the central positioning through-hole, and the air inlet channel of the support seat ring, the air inlet annular groove of the support seat ring and the air inlet channel on the positioning shaft of the jacking tray are in communication successively; and a plurality of hot air flow discharge ports communicating with the inner holes of the tightening ring are also circumferentially arranged at an upper end part of the tightening ring of the automatic stacking die.

Preferably, the straight-handle heating fan is a straight-handle electric blower.

In the present invention, a guide pin is arranged between the jacking tray and the spring ring to prevent relative rotation thereof.

In the present invention, an elastic retainer ring for limiting a distance of floating up and down of the jacking tray is arranged on an outer circle of a lower end of the positioning shaft of the jacking tray.

In the present invention, the straight-handle heating fan is mounted in the mounting hole of the jacking tray via a transition mounting sleeve which is sleeved on the outer circle of the handle of the straight-handle heating fan.

In the present invention, a wiring hole is arranged at the lower end of the mounting hole of the jacking tray. A conductive slip ring is arranged on the wiring hole. A wire outlet hole is arranged on the spring ring. A wire of the straight-handle heating fan is led out to the outside through the conductive slip ring and the wire outlet hole. A data wire of the displacement sensor is led out to the outside through the wire outlet hole.

According to the working principle of the above-mentioned hot air flow heating device, before blanking, a straight-handle heating fan on the hot air flow heating device ejects a hot air flow upwards, and the hot air flow flows upwards through the inner hole of the core stamping sheet in the tightening ring and continues to ascend to the upper material strip before blanking, so as to preheat the adhesive on the lower end surface of the material strip. In the blanking process, the core stamping sheet on the material strip enters the tightening ring and forms a hot air flow collecting cavity with the original core stamping sheet in the tightening ring, and the hot air flow in the cavity is discharged via the hot air flow discharge port at the upper part of the tightening ring and heats the inner hole of the core stamping sheet and the cavity part, so that the catalyst and the main adhesive on the core stamping sheets located at the upper and lower positions of the cavity are heated at the same time. After the blanking is completed, the heated catalyst and the main adhesive are in contact with each other and are pressed together, thereby directly heating the adhesive between the upper and lower adjacent core stamping sheets, thereby improving the curing speed of the adhesive. In addition, during the rise of the hot air flow, the core stamping sheet within the tightening ring is also simultaneously heated by the hot air flow to provide indirect heating of the adhesive. The hot air flow heating device in the present invention has a dual heating effect of direct heating and indirect heating of the adhesive compared with the method of indirect heating of the adhesive using a magnetic induction heating core stamping sheet in the prior art, so that the heating rate of the adhesive is faster and the curing effect of the adhesive is better.

The laser heating head and the hot air flow heating device in the invention may be used individually or may be used in combination according to the requirements of the adhesive strength of the core stamping sheet. They may also not be used when the ambient temperature is high or the bond strength requirements of the core stamping sheet are relatively low.

In the present invention, according to the number of laminations of each group of cores, during the blanking process of the material strip, one piece of core stamping sheet is a adhesive-free core stamping sheet without applying adhesive. When the adhesive-free core stamping sheet enters may separate two groups of stacked cores which are adjacent above and below when entering the tightening ring.

In the present invention, a core discharging pneumatic push rod and a belt conveyor are separately arranged on two sides of the servo electric cylinder. After a group of cores are stacked, the core which is seated on the jacking tray is pushed onto the belt conveyor by the core discharging pneumatic push rod, and then the core is conveyed to the equipment in the subsequent process by the belt conveyor.

An adhesive dispensing lamination process for a stator and rotor core of a motor comprises the steps of:

(1) adhesive dispensing station setting: successively arranging a stamping station, an adhesive dispensing station for the first adhesive component, an adhesive dispensing station for the second adhesive component and a blanking station on the stamping progressive die for the stator and rotor core of the motor according to the moving direction of a material strip, wherein an automatic stacking mechanism for core stamping sheets is arranged below the blanking station; one of the adhesive dispensing station for the first adhesive component and the adhesive dispensing station for the second adhesive component is located at an upper position of the material strip, and the other adhesive dispensing station is located at a lower position of the material strip; wherein an adhesive dispensing device for the first adhesive component for dispersing and dispensing a first adhesive component to one side of the material strip is arranged at the adhesive dispensing station for the first adhesive component; an adhesive dispensing device for the second adhesive component for dispersing and dispensing a second adhesive component to the other side of the material strip is arranged at the adhesive dispensing station for the second adhesive component; each adhesive dispensing position arranged on one side of the material strip by the adhesive dispensing device for the first adhesive component and each adhesive dispensing position arranged on the other side of the material strip by the adhesive dispensing device for the second adhesive component are arranged opposite to each other in an up-down direction; wherein, in the first adhesive component and the second adhesive component, the adhesive of one of the components is a main adhesive and the adhesive of the other component is a catalyst for promoting the curing of the main adhesive;

(2) stamping: moving the material strip forwards in a stepwise manner on a stamping progressive die for a stator and rotor core of a motor, and successively stamping a tooth groove, a through hole and an inner contour through a stamping die at each stamping station;

(3) dispensing: continuing to move the material strip forwards until reaching the adhesive dispensing station for the first adhesive component and the adhesive dispensing station for the second adhesive component successively, and performing dispensing of the first adhesive component and the second adhesive component on the upper and lower sides of the material strip successively via the adhesive dispensing device for the first adhesive component and the adhesive dispensing device for the second adhesive component;

(4) blanking: continuing to move the material strip forwards to a blanking station, and then blanking the core stamping sheet on the material strip via a blanking die on the blanking station; and (5) stacking: under the action of the blanking die at the blanking station, pressing the core stamping sheet into the tightening ring below the blanking station, and overlapping two upper and lower adjacent core stamping sheets into the tightening ring together, so that the main adhesive and the catalyst between the two core stamping sheets are quickly solidified due to mutual contact and pressing, thereby being laminated together;

wherein in the stacking step of step (5), before blanking, the jacking tray on the telescopic rod of the servo electric cylinder below the tightening ring is also pre-set at a pre-set distance position from the lower end face of the core in the tightening ring; after the core stamping sheet in the tightening ring moves down by a distance of the thickness of the core stamping sheet under the action of the blanking die during the blanking, the lowest core stamping sheet thereof is just tightened by the jacking tray, so as to achieve an axial tightening action on each core stamping sheet in the tightening ring during the blanking.

As a further improvement of the adhesive dispensing lamination process for the stator and rotor core of the motor of the present invention, in the step (1) of setting a dispensing station, a washing station is further arranged after the stamping station and before the adhesive dispensing station for the first adhesive component for cleaning the position of each adhesive dispensing position on the material strip before the dispensing operation; a negative pressure washing device for cleaning the position of each adhesive dispensing position using a negative pressure adsorption principle is arranged on the washing station; a laser heating head for performing non-contact local pre-heating on the surface of each adhesive dispensing position is further arranged on a negative pressure adsorption channel of the negative pressure washing device; a hot air flow heating device for performing auxiliary heating on the core stamping sheet and the adhesive in the lamination process so as to accelerate the curing of the adhesive is further arranged on a telescopic rod of a servo electric cylinder below the blanking station; after the stamping procedure of step (2) and before the adhesive dispensing procedure of step (3), cleaning and laser heating the position of each adhesive spot on the material strip are performed by the negative pressure washing device in advance, and then the adhesive dispensing operation of step (3) is performed; in the stacking procedure of step (5), the hot air flow heating device is also activated to perform auxiliary heating on the core stamping sheet and the adhesive during the stacking process so as to achieve accelerated curing of the adhesive.

The invention has the following beneficial effects.

Firstly, in the present invention, a stamping progressive die for a stator and rotor core of a motor using adhesive dispensing lamination and an adhesive dispensing process are provided. Two adhesive dispensing position stations are provided, and stationing of a main adhesive and a catalyst are respectively performed on both sides of a material strip, so as to improve the curing speed of the adhesive during lamination of the core stamping sheets. The magnetic properties of the core may be improved by the adhesive dispensing lamination of the core stamping sheets, thereby improving the efficiency of the motor and reducing the energy consumption of the motor.

Secondly, according to the stamping progressive die for the stator and rotor core of the motor using the adhesive dispensing lamination and the adhesive dispensing process in the present invention, an adhesive dispensing station for the first adhesive component and an adhesive dispensing station for the second adhesive component are arranged adjacently and separately, so as to avoid the defect that the adhesive of an upper adhesive dispensing device drips onto a lower adhesive dispensing device when the material strip is not present to cause the adhesive outlet of the adhesive dispensing device to be solidified and sealed and fail when the two adhesive dispensing stations are arranged up and down at the same position, thereby improving the reliability of the adhesive dispensing device.

Thirdly, according to the stamping progressive die for the stator and rotor core of the motor using the adhesive dispensing lamination and the adhesive dispensing process in the present invention, by arranging an adhesive dispensing station of a catalyst with a relatively low viscosity after a stamping station and an adhesive dispensing station of a main adhesive and before a blanking station, the disadvantage that the catalyst with a low viscosity is spilled outside the position of core stamping sheets due to the stamping vibration of a plurality of stamping stations may be avoided.

Fourthly, according to the stamping progressive die for the stator and rotor core of the motor using the adhesive dispensing lamination and the adhesive dispensing process in the present invention, a servo pressure discharge system for applying a jacking force to the core in the automatic stacking die is further provided below the automatic stacking die. The thickness of the core stack may be controlled by a specially designed displacement control assembly (a rotatable floating inductive jacking assembly) on a servo electric cylinder so as to avoid an over-difference in the thickness of the core, thereby reducing the rework operations of adding sheets or reducing sheets due to the over-difference in the thickness of the stack in the subsequent step.

Fifthly, according to the stamping progressive die for the stator and rotor core of the motor using the adhesive dispensing lamination and the adhesive dispensing process in the present invention, a rotary core lamination pressing die is matched on a punch press, and cooperates with a specially provided pressure discharge system with a rotatable floating inductive jacking assembly, so that the upper and lower adjacent core stamping sheets are staggered and stacked after relatively rotating through a certain bisection angle. The uneven thickness error (which is caused by the uneven thickness of the sheet material of the core stamping sheets) and the flatness error on the core stamping sheets may be homogenized by means of the staggered and stacked mounting. Thus, the uniformity of the thickness after lamination of the core is improved, and the total height error after lamination of the core is reduced, thereby overcoming the disadvantages of uneven height and bigger total height error of the core in the traditional stamping and stacking.

Sixthly, according to the stamping progressive die for the stator and rotor core of the motor using the adhesive dispensing lamination and the adhesive dispensing process in the present invention, a servo metering adhesive pump controlled by a servo in the adhesive supply system of the adhesive dispensing device is used as the power for conveying the adhesive, so that the accurate and quantitative conveying of the adhesive may be achieved, thereby facilitating the accurate control of the amount of the adhesive dispensing, and overcoming the disadvantages of the prior art that the amount of the adhesive dispensing is difficult to be accurately controlled due to the instability of air pressure during the pneumatic conveying of the adhesive.

Seventhly, according to the stamping progressive die for the stator and rotor core of the motor using the adhesive dispensing lamination and the adhesive dispensing process in the present invention, each adhesive dispensing nozzle body of the adhesive dispensing device is separately provided with a servo plunger metering pump via an adhesive-feeding pipeline, which is advantageous to accurately set different adhesive dispensing amounts for different positions on the core stamping sheet, thereby further improving the quality of the adhesive dispensing lamination.

Eighthly, according to the stamping progressive die for the stator and rotor core of the motor using the adhesive dispensing lamination and the adhesive dispensing process in the present invention, a cleaning liquid supply system is connected to an adhesive nozzle body of an adhesive dispensing device via a washing pipe joint and a washing pipeline, so that online cleaning of the adhesive feeding channel of the adhesive dispensing nozzle body may be achieved, and the maintainability thereof is good, overcoming disadvantages of the cleaning and maintenance of the existing pneumatic adhesive supply system.

Ninthly, according to the stamping progressive die for the stator and rotor core of the motor using the adhesive dispensing lamination and the adhesive dispensing process in the present invention, a washing station is provided after the stamping station and before the adhesive dispensing station for the first adhesive component, so that the oil stain originally existing on the material strip and the oil stain generated during the stamping process may be removed together at the position of each adhesive dispensing position by means of negative pressure adsorption, avoiding the situation that the bonding between the adhesive and the core stamping sheet is weak due to the oil stain at the adhesive dispensing position, thereby improving the quality of the adhesive dispensing lamination for the core stamping sheet.

Tenthly, according to the stamping progressive die for the stator and rotor core of the motor using the adhesive dispensing lamination and the adhesive dispensing process in the present invention, a hot air flow heating device is arranged on the automatic stacking mechanism of the core stamping sheet, and the hot air flow heating device has a dual heating effect of direct heating and indirect heating on the adhesive, so that the heating rate of the adhesive is faster and the effect of the adhesive curing is better, thereby further improving the quality of the adhesive dispensing lamination of the core stamping sheets.

Figure 1:
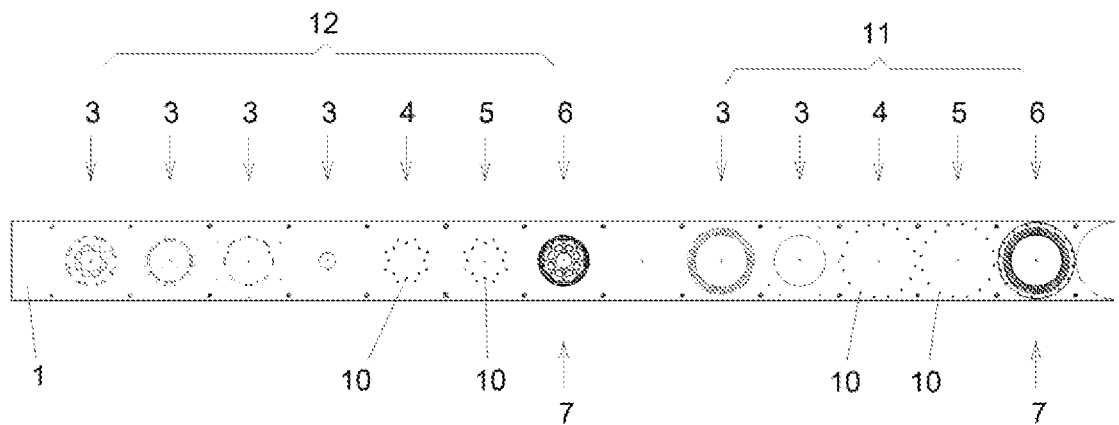
FIG. 1 is a schematic diagram of a material strip layout of a stamping progressive die for a stator and rotor core of a motor using adhesive dispensing lamination according to the present invention.

In the drawings, 1, material strip, 2, stamping progressive die for stator and rotor core of motor, 3, stamping station, 4, adhesive dispensing station for a first adhesive component, 5, adhesive dispensing station for a second adhesive component, 6, blanking station, 7, automatic stacking mechanism of core stamping sheet, 8, adhesive dispensing device for a first adhesive component, 9, adhesive dispensing device for a second adhesive component, 10, adhesive dispensing position, 11, motor stator punching station group, 12, motor rotor punching station group, 13, upper die plate, 14, lower die plate, 15, discharge plate, 16, automatic stacking die, 17, tightening ring, 18, servo electric cylinder, 19, telescopic rod, 20, jacking tray, 21, adhesive dispensing tray, 22, adhesive dispensing nozzle body, 23, adhesive feeding channel, 24, adhesive dispensing outlet, 25, adhesive feeding pipe joint, 26, washing channel, 27, washing pipe joint, 28, adhesive solenoid valve, 29, cleaning liquid solenoid valve, 30, washing station, 31, negative pressure washing device, 32, washing tray, 33, washing pipe assembly, 34, negative pressure chamber, 35, outer washing pipe, 36, inner washing pipe, 37, rubber sealing ring, 38, vacuumizing device, 39, air filter, 40, laser heating head, 41, hot air flow heating device, 42, straight-handle heating fan, 43, air inlet channel, 44, hot air flow discharge port, 45, core stamping sheet, 46, core discharging pneumatic push rod, 47, belt conveyor, 48, rotatable floating inductive jacking assembly, 49, displacement sensor, 50, support seat ring, 51, planar thrust bearing, 52, spring ring, 53, compression spring; 54, transition mounting sleeve, 55, elastic retainer ring, 56, conductive slip ring, 57, air inlet annular groove, 58, guide pin, 59, positioning shaft, 60, adhesive supply system, 61, cleaning liquid supply system, 62, air dryer, 63, air booster pump, 64, air accumulator, 65, air pressure regulating valve, 66, cleaning liquid airtight pressure tank 67, nut.

DETAILED DESCRIPTION OF THE INVENTION

The detailed description of the present invention are further described below in combination with the attached drawings and embodiments. The following embodiments are only intended to more clearly illustrate the technical solution of the present invention, and are not intended to limit the scope of the present invention.

Embodiment 1

Figure 2:
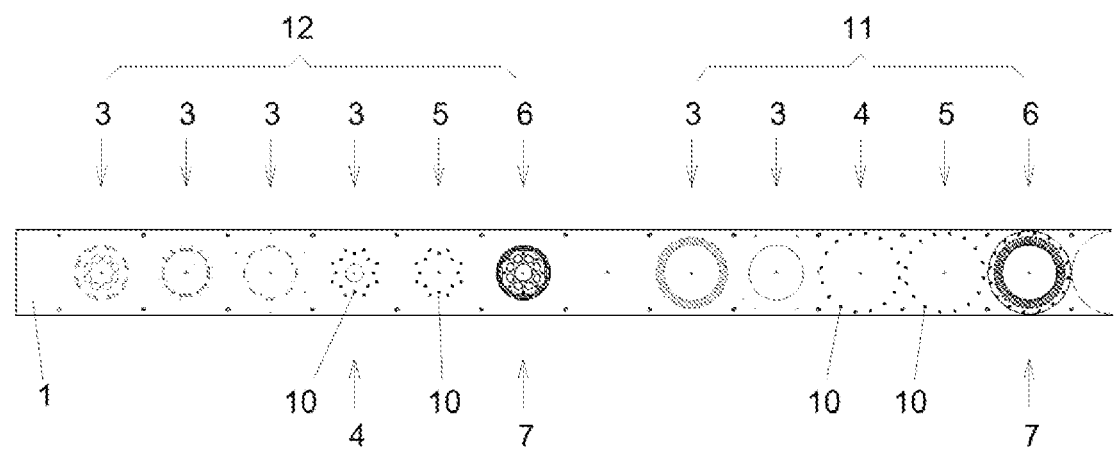
FIG. 2 is a schematic diagram of a material strip layout for simultaneously providing an adhesive dispensing station for a first adhesive component on the basis of the schematic diagram of the material strip layout of FIG. 1 at a last stamping station (a stamping station for stamping the inner profile of the rotor of a motor) before a blanking station.
Figure 3:
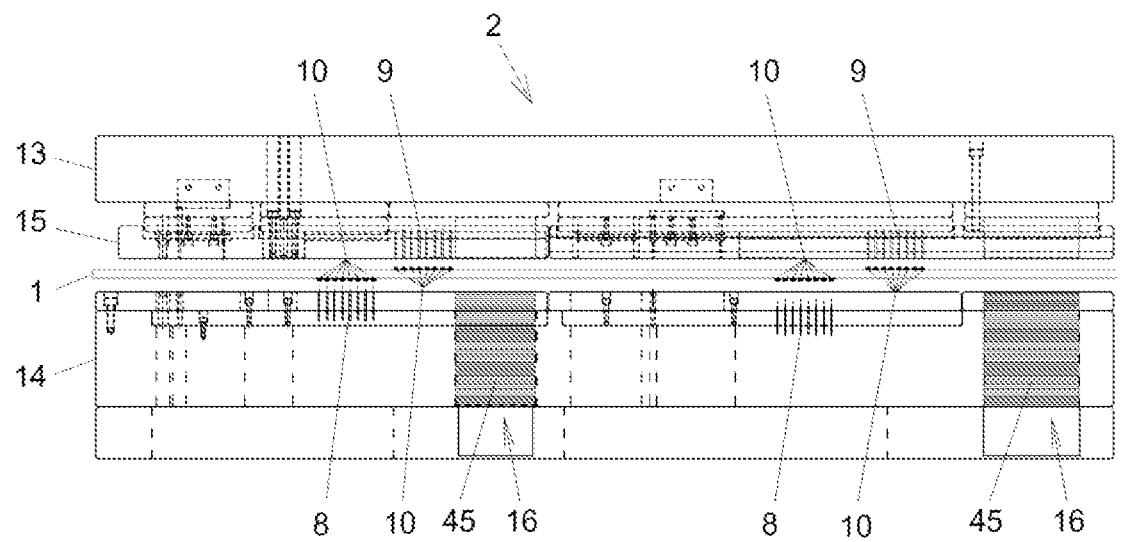
FIG. 3 is a schematic structural view of a stamping progressive die for a stator and rotor core of a motor using adhesive dispensing lamination according to the present invention.
Figure 4:
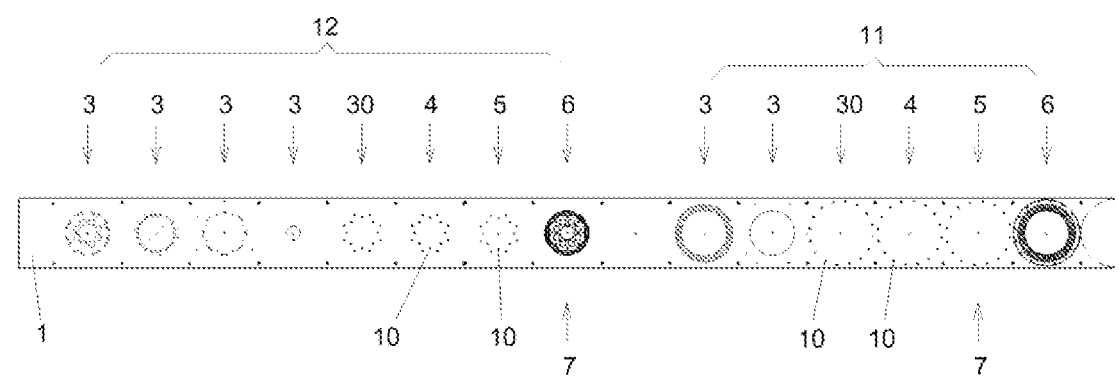
FIG. 4 is a schematic diagram of a material strip layout after a washing station is additionally provided on the basis of the schematic diagram of the material strip layout of FIG. 1.
Figure 5:
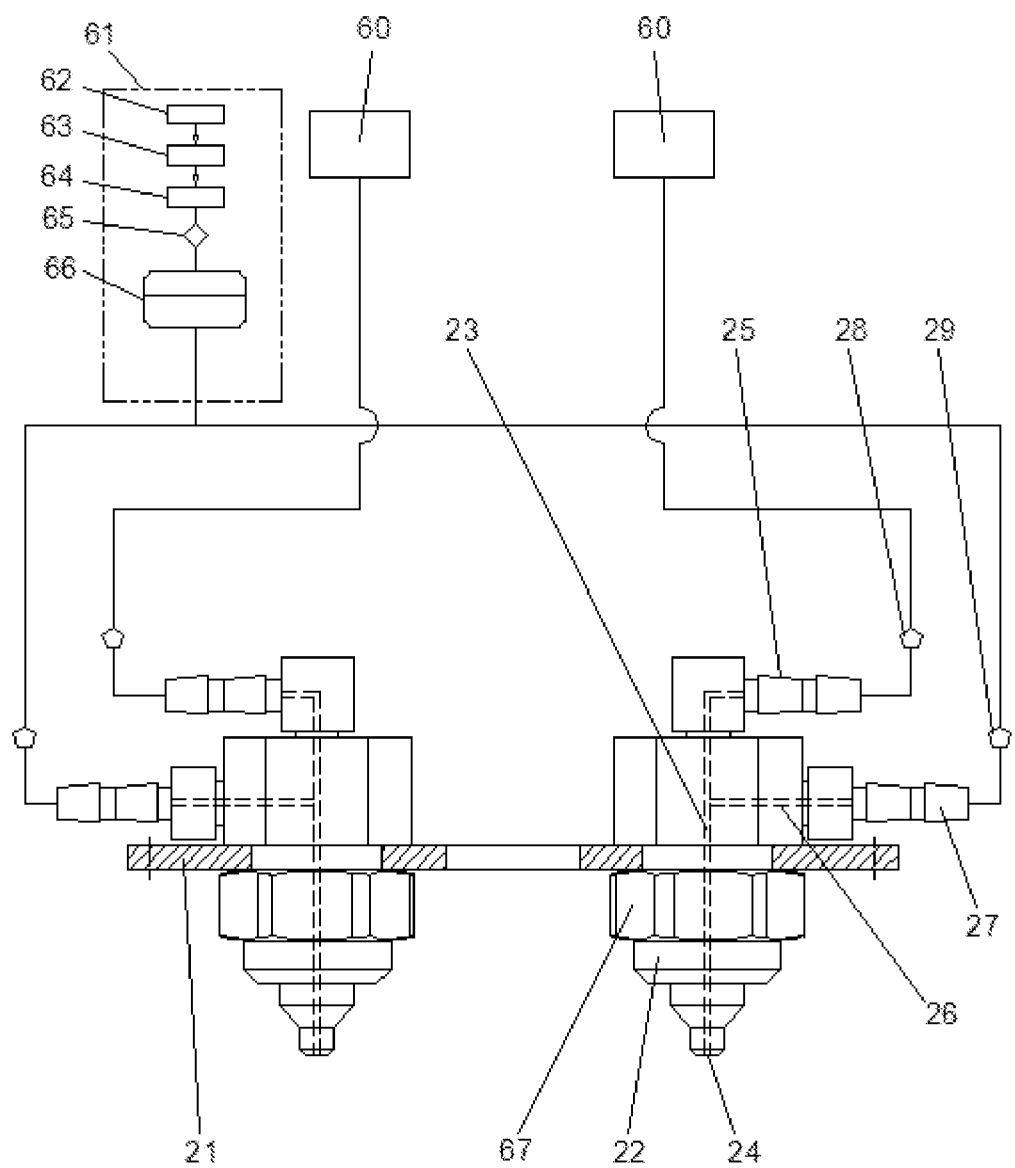
FIG. 5 is a schematic structural view of a adhesive dispensing device including an adhesive dispensing device for a first adhesive component and an adhesive dispensing device for a second adhesive component.
Figure 6:
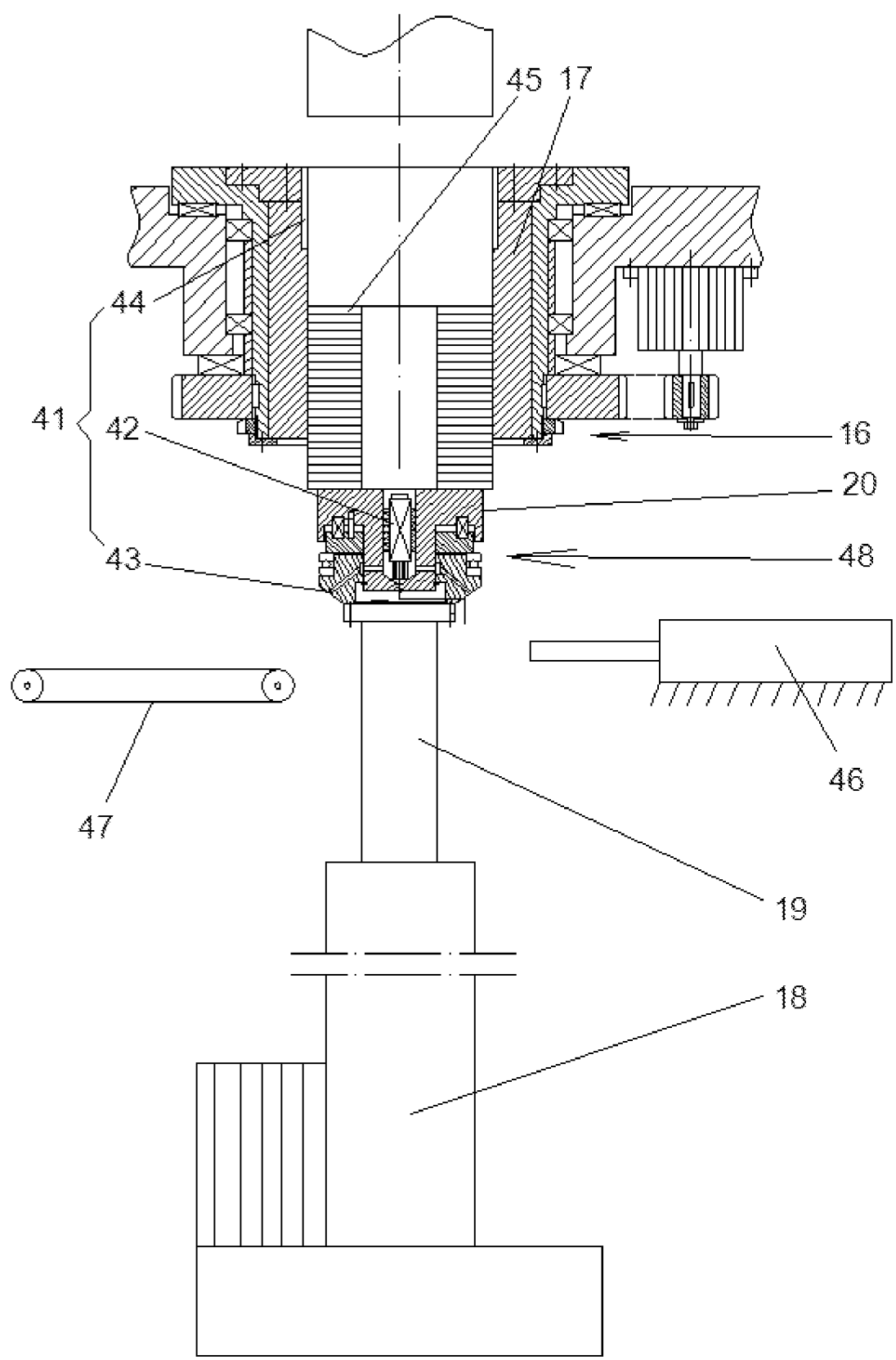
FIG. 6 is a schematic structural view of an automatic stacking die of an automatic stacking mechanism for core stamping sheets.
Figure 7:
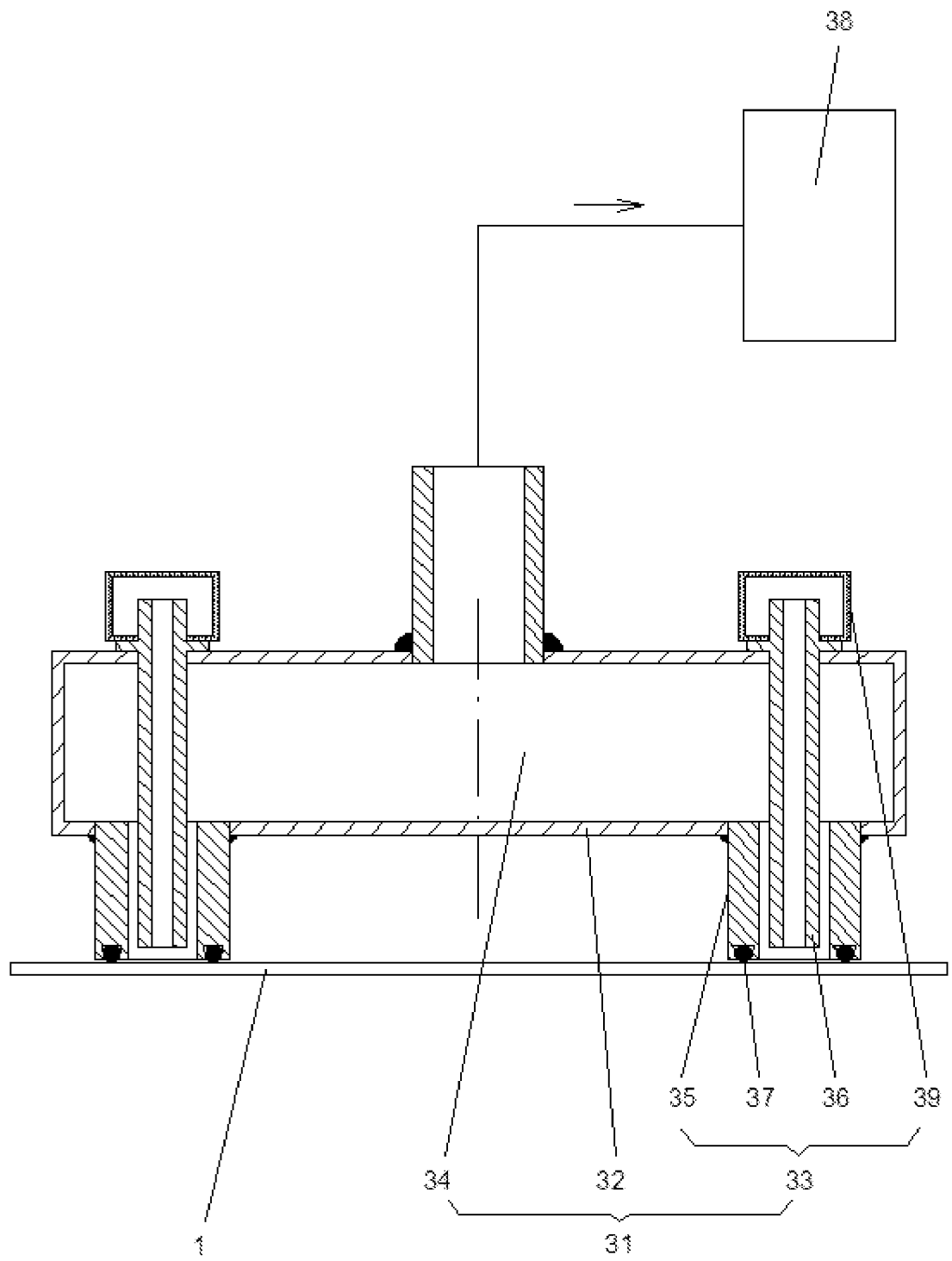
FIG. 7 is a schematic structural view of a negative pressure washing device provided at a washing station.
Figure 8:
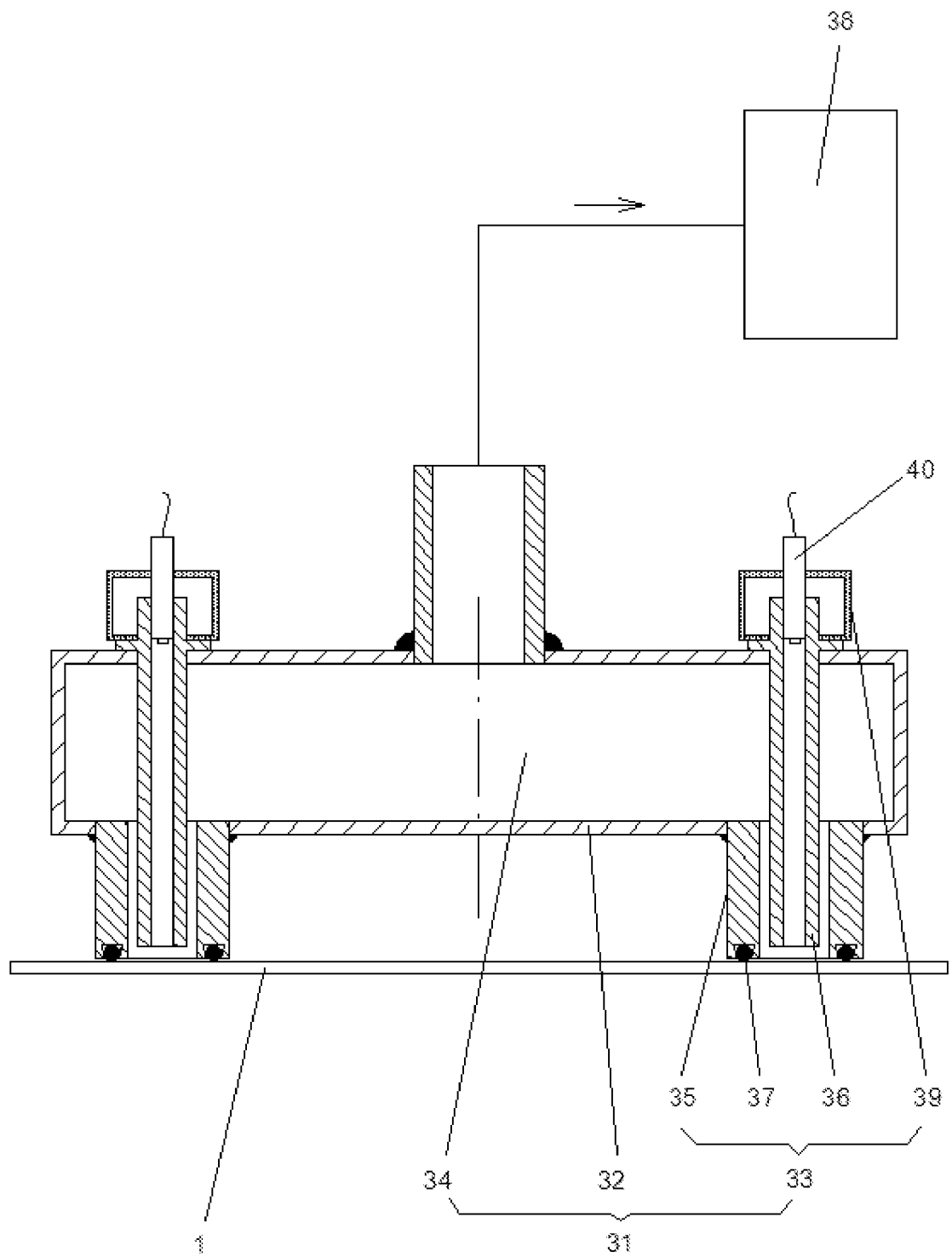
FIG. 8 is a schematic structural view further improved on the negative pressure washing device of FIG. 7.
Figure 9:
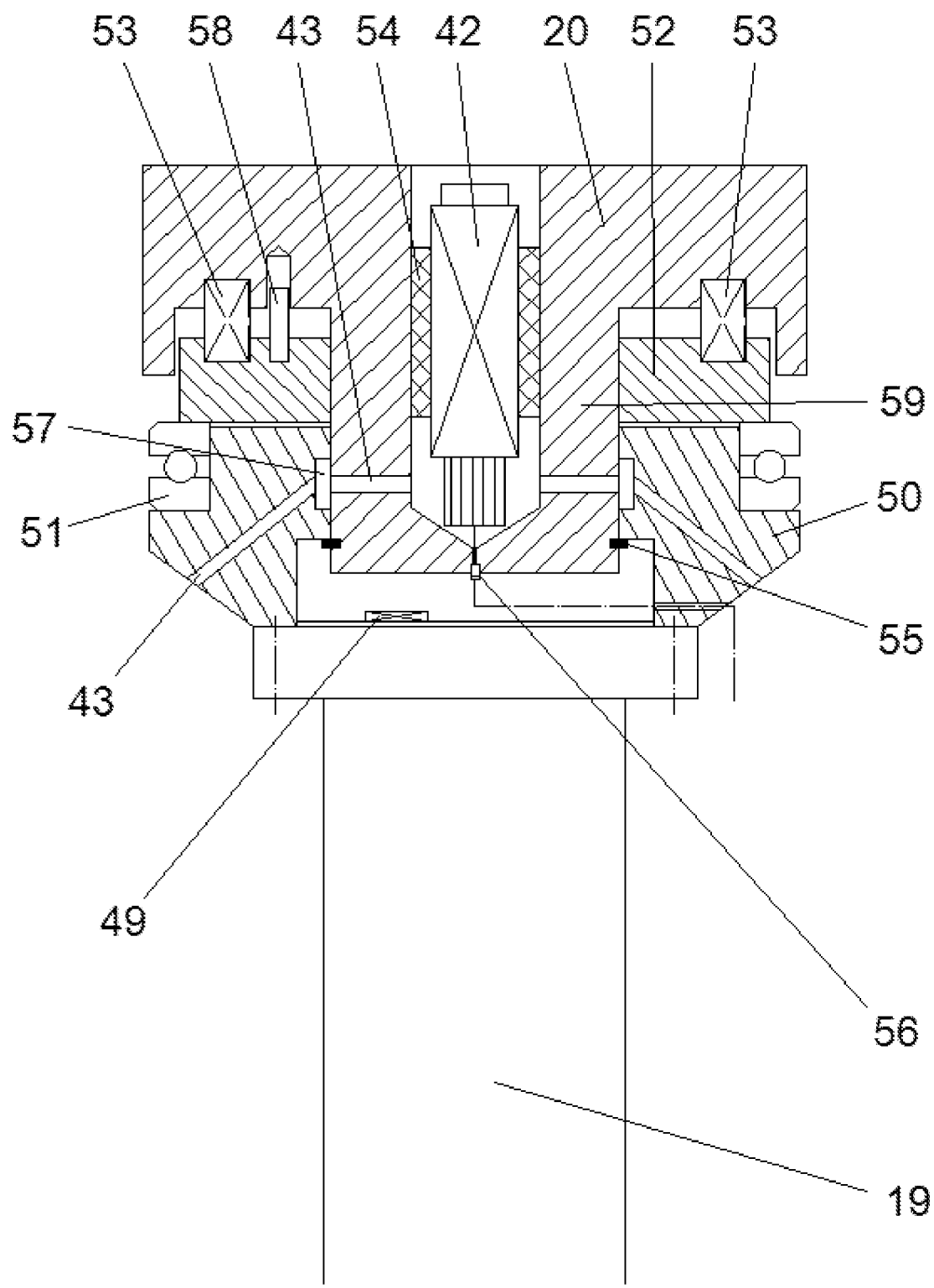
FIG. 9 is an enlarged partial view of a rotatable floating inductive jacking assembly of FIG. 6.

As shown in FIGS. 1 to 8, an embodiment of a stamping progressive die for a stator and rotor core of a motor using adhesive dispensing lamination according to the present invention includes a stamping station 3, an adhesive dispensing station for a first adhesive component 4, an adhesive dispensing station for a second adhesive component 5 and a blanking station 6 which are successively arranged on the stamping progressive die 2 for the stator and rotor core of the motor according to the moving direction of a material strip 1, wherein an automatic stacking mechanism 7 for core stamping sheets is arranged below the blanking station 6; one of the adhesive dispensing station for the first adhesive component 4 and the adhesive dispensing station for the second adhesive component 5 is located at an upper position of the material strip 1, and the other adhesive dispensing station is located at a lower position of the material strip 1; wherein an adhesive dispensing device for a first adhesive component 8 for dispersing and dispensing a first adhesive component to one side of the material strip is arranged at the adhesive dispensing station for the first adhesive component 4; an adhesive dispensing device for a second adhesive component 9 for dispersing and dispensing a second adhesive component to the other side of the material strip is arranged at the adhesive dispensing station for the second adhesive component 5; each adhesive dispensing position 10 arranged on one side of the material strip 1 by the adhesive dispensing device for the first adhesive component 8 and each adhesive dispensing position 10 arranged on the other side of the material strip 1 by the adhesive dispensing device for the second adhesive component 9 are arranged opposite to each other in an up-down direction.

Preferably, in the first adhesive component and the second adhesive component, the adhesive of one of the components is the main adhesive, and the adhesive of the other component is a catalyst for promoting the curing of the main adhesive.

The automatic stacking mechanism for the core stamping sheets 7 includes an automatic stacking die 16 which is a rotary core lamination pressing die. The rotary core lamination pressing die 16 is provided with a tightening ring 17 in an interference fit with an outer edge of the core stamping sheet 45, and the tightening ring 17 is driven by a servo motor to realize that the rotation angle of the tightening ring 17 is changeable. The automatic stacking mechanism for the core stamping sheets further includes a servo pressure discharge system arranged below the automatic stacking die 16 for applying a jacking force to the core in the rotary core lamination pressing die 16. The servo pressure discharge system includes a servo electric cylinder 18 arranged below the tightening ring 17, and a rotatable floating inductive jacking assembly 48 arranged on an upper end of a telescopic rod 19 of the servo electric cylinder 18. The rotatable floating inductive jacking assembly 48 includes a jacking tray 20 rotatably arranged on the telescopic rod 19 of the servo electric cylinder 18 and capable of floating up and down at a certain distance, and a displacement sensor 49 for monitoring a floating up or down position of the jacking tray 20 arranged on a telescopic rod 19 of the servo electric cylinder 18 and below the jacking tray 20.

Preferably, the displacement sensor 49 is a non-contact distance sensitive sensor.

The rotatable floating inductive jacking assembly 48 further includes a support seat ring 50 fixed on an upper end of the telescopic rod 19 of the servo electric cylinder 18 and a central positioning through-hole arranged on the support seat ring 50. A positioning shaft 59 is arranged on a lower end of the jacking tray 20, and the jacking tray 20 is rotatably arranged on the central positioning through-hole of the support seat ring 50 via the positioning shaft 59. A planar thrust bearing 51 is arranged on an upper portion of the support seat ring 50. A spring ring 52 is further sleeved on the positioning shaft 59 of the jacking tray 20. The spring ring 52 is located between a lower end surface of the jacking tray 20 and an upper end surface of the planar thrust bearing 51. A compression spring 53 for floating and tightening the jacking tray is arranged between the jacking tray 20 and the spring ring 52. During the blanking, under the action of a blanking die at a blanking station, each core punch 45 is successively extruded into the tightening ring 17 of the automatic stacking die 16 to achieve the lamination of each core punch 45, and the main adhesive and the catalyst located at each position point between the upper and lower adjacent core stamping sheets 45 in the tightening ring 17 are in mutually opposite contact, so that the main adhesive is accelerated to solidify, thereby bonding the upper and lower adjacent core stamping sheets 45 firmly to form a core. When the core stamping sheets 45 are stacked, accurate stacking of the core stamping sheets 45 is achieved by the servo pressure discharge system, thereby forming a core having a desired overall height dimension.

Once the core stamping sheet 45 located on the blanking station 6 is blanked, the telescopic rod 19 of the servo electric cylinder 18 descends by a distance of the thickness of the core stamping sheet 45, so as to ensure that after each blanking, the jacking tray 20 on the telescopic rod 19 always simultaneously jacks against the lower end face of the core in the tightening ring 17.

The servo electric cylinder 18 is connected to a controller.

Preferably, the controller is a PLC controller.

In the above-mentioned servo pressure discharge system, the servo electric cylinder 18 is used as the driving element of the jacking core, which has the advantages of compact structure, no oil pollution and fast and controllable reaction compared with the hydraulic jacking cylinder.

The servo pressure discharge system achieves accurate lamination of the core stamping sheets, including the steps of:
 (1) initial setting of jacking tray positions: when the inside of the tightening ring 17 is empty, arranging the jacking tray 20 at a predetermined height position by adjusting the upper and lower positions of the telescopic rod 19 of the servo electric cylinder 18, wherein the predetermined height position of the jacking tray 20 needs to ensure that the jacking tray 20 is in elastic floating contact with the core stamping sheet after the first core stamping sheet blanks into the tightening ring 17;
 (2) precise presetting of jacking tray positions: monitoring the distance between a lower end face of the jacking tray 20 and an upper end face of the spring ring 52 by a distance induction sensor 49 at an upper end of the telescopic rod 19 of the servo electric cylinder 18 after the first core stamping sheet blanks into the tightening ring 17, and then adjusting the upper and lower positions of the telescopic rod 19 of the servo electric cylinder 18, so that the distance between the lower end face 20 of the jacking tray and the upper end face of the spring ring 52 is exactly equal to the distance of the thickness of one core stamping sheet 45;
 (3) transposition setting of the tightening ring: according to the equal division condition of the groove body or the hole on the core stamping sheet 45, rotating the tightening ring 17 by a certain equal division angle by means of rotary core lamination pressing die 16;
 (4) blanking lamination: under the action of the punching pressure of the blanking die at the blanking station, extruding the core stamping sheet 45 to be blanked into the tightening ring 17 of the automatic stacking die 16 and to be in contact with the core stamping sheet 45 blanked previously in the tightening ring 17, so as to drive a lowermost core stamping sheet 45 in the tightening ring 17 to move downwards together; then synchronously pushing the jacking tray floatingly supported on the lowermost core stamping sheet 45 to move downwards, so that the lower end face of the jacking tray 20 is in contact with the upper end face of the spring ring 52, wherein the displacement amount passed when the jacking tray 20 moves downwards into contact with the spring ring 52 is just equal to the distance of the thickness of one core stamping sheet 45, so that the gap between two adjacent core stamping sheets 45 is eliminated, and accurate stacking is achieved; before the next blanking and stacking, based on the data measured by the distance induction sensor 49, actively moving the telescopic rod 19 of the servo electric cylinder 18 down by a distance of the thickness of the core stamping sheet 45; and at the same time, rotating the tightening ring 17 by a certain bisection angle by means of the rotary core lamination pressing die 16, so as to prepare for the next blanking and stacking.

Preferably, in order to realize the mutual nesting of the motor stator stamping and the motor rotor stamping, a motor rotor punching station group 12 and a motor stator punching station group 11 are successively arranged on the stamping progressive die for the stator and rotor core of the motor according to the moving direction of the material strip. A stamping station 3, an adhesive dispensing station for the first adhesive component 4, an adhesive dispensing station for the second adhesive component 5 and a blanking station 6 are respectively arranged on the motor rotor blanking station group 12 and the motor stator blanking station group 11. The automatic stacking mechanism 7 for the core stamping sheets is respectively arranged below each of the blanking stations 6.

Preferably, the number of the stamping stations 3 is several in order to accommodate the requirements of tooth groove punching, through hole punching and inner contour punching on the core stamping sheet. Each of the stamping stations 3 is respectively provided with an upper stamping die and a lower stamping die. The blanking station is provided with an upper blanking die and a blanking die; the upper stamping die and the upper blanking die are both male dies; the lower stamping die and the blanking die are both female dies. The male dies are fixed on an upper die plate 13 of the stamping progressive die 2 of the stator and rotor core of the motor. The female dies are fixed on a lower die plate 14 of the stamping progressive die 2 of the stator and rotor core of the motor. A discharge plate 15 for withdrawing the male dies is further arranged on a lower end face of the upper die plate 13.

Preferably, where there are a plurality of stamping stations 3, an adhesive dispensing station for the first adhesive component 4 may be provided at the same time on the last stamping station 3 preceding the blanking station 6 (stamping station for stamping the inner contour) to make the die structure more compact.

Preferably, the first adhesive component is a main adhesive with a relatively high viscosity, and the second adhesive component is a catalyst with a relatively low viscosity. The adhesive dispensing station for the first adhesive component 4 as a main adhesive dispensing station is located on the stamping progressive die 2 of the stator and rotor core of the motor at a position below the material strip 1. The adhesive dispensing station for the second adhesive component 5 as a catalyst dispensing station is located on the stamping progressive die 2 of the stator and rotor core of the motor at a position above the material strip 1.

Preferably, the main adhesive has a viscosity of 2000-6000 CP and the catalyst has a viscosity of 50-2500 CP at a temperature of 20° C.

More preferably, the main adhesive has a viscosity of 5000-6000 CP and the catalyst has a viscosity of 500-1000 CP at a temperature of 20° C.

The higher viscosity of the main adhesive ensures that it does not fall off when it is coated onto the lower end face of the material strip during stamping, and the lower viscosity of the catalyst facilitates contact with the main adhesive during the core stamping sheet 45 lamination, allowing more sufficient penetration into the main adhesive after lamination, thereby improving the lamination bond strength of the core stamping sheet 45.

In this embodiment, the adhesive dispensing device for the first adhesive component 8 as a main adhesive dispensing device is mounted on a lower die plate 14 of the stamping progressive die 2 for the stator and rotor core of the motor; and the adhesive dispensing device for the second adhesive component 9 as a catalyst dispensing device is mounted on a discharge plate 15 of the stamping progressive die 2 of the stator and rotor core of the motor.

In the present embodiment, the adhesive dispensing device for the first adhesive component 8 and the adhesive dispensing device for the second adhesive component 9 respectively include an adhesive dispensing tray 21 and a number of adhesive dispensing nozzle bodies 22 dispersedly arranged on the adhesive dispensing tray 21. The adhesive dispensing nozzle bodies 22 are provided with an adhesive feeding channel 23. One end of the adhesive feeding channel 23 is an adhesive dispensing outlet 24, and the other end of the adhesive feeding channel 23 is connected to an adhesive feeding pipe joint 25 which is connected to an adhesive supply system 60 via an adhesive feeding pipeline. The adhesive dispensing nozzle body 22 is further provided with a washing channel 26. One end of the washing channel 26 is in communication with the adhesive feeding channel 23, and one end of the washing channel 26 is connected to a washing pipe joint 27 which is connected to a cleaning liquid supply system 60 via a washing pipeline. An adhesive solenoid valve 28 is arranged on the adhesive feeding pipeline. A cleaning liquid solenoid valve 29 is arranged on the washing pipeline. The adhesive supply system 60 includes a servo metering adhesive pump connected to the adhesive feeding pipeline.

Preferably, a servo metering adhesive pump of the adhesive supply system 60 is a servo plunger metering pump.

In order to control the amount of adhesive dispensing more accurately, in a further improvement, each dispensing nozzle body 22 is separately provided with a servo plunger metering pump via an adhesive feeding pipeline.

In this embodiment, the washing line connecting each dispensing nozzle body 22 is connected to the same cleaning header pipe and then to the cleaning liquid supply system 61.

In this embodiment, the cleaning liquid supply system 61 includes an air dryer 62, an air booster pump 63, an air accumulator 64, an air pressure regulating valve 65, and a cleaning liquid airtight pressure tank 66 connected in sequence.

In this embodiment, an outer thread is arranged on an outer circumference of one end of the adhesive dispensing nozzle body 22, and the adhesive dispensing nozzle body 22 is fixed on the adhesive dispensing tray 21 via a nut 67 connected to the outer thread of the adhesive dispensing nozzle body 22.

In this embodiment, the adhesive dispensing nozzle body 22 is dispersedly arranged at intervals on the adhesive dispensing tray 21.

In the present embodiment, the adhesive dispensing tray 21 is mounted on an adhesive dispensing station of a progressive die of the progressive die for the stator and rotor core of the motor; the adhesive dispensing tray 21 may 21 be mounted above or below the material strip; 21 and the adhesive dispensing nozzle body 22 of the adhesive dispensing tray 21 has its adhesive dispensing outlet 24 aligned with the surface of the material strip.

During the adhesive dispensing operation, the adhesive solenoid valve 28 is in an open state, and the adhesive is output from the adhesive dispensing outlet 24 on the adhesive dispensing nozzle body 22 via the adhesive supply system. During the cleaning operation, the adhesive solenoid valve 28 is in a closed state, and the cleaning liquid solenoid valve 29 is in an open state. The cleaning of the adhesive feeding channel 23 on the adhesive dispensing nozzle body 22 is achieved via the cleaning liquid supply system.

Note that in order to prevent the cleaning liquid from contaminating the die, a moisture-absorbing cloth may be temporarily provided at the adhesive dispensing outlet 24 of the adhesive dispensing nozzle body 22 during the on-line washing operation.

As a further improvement of this embodiment, a washing station 30 for washing the position of each adhesive dispensing position 10 on the material strip 1 before the adhesive dispensing operation is further arranged after the stamping station 3 and before the adhesive dispensing station for the first adhesive component 4, and a negative pressure washing device 31 for washing the position of each adhesive dispensing position 10 using a negative pressure adsorption principle is arranged on the washing station 30. The negative pressure washing device 31 includes a washing tray 32 and a plurality of washing pipe assemblies 33 dispersedly arranged on the washing tray 32, wherein a negative pressure chamber 34 is provided inside the washing tray 32. The washing pipe assemblies 33 includes an outer washing pipe 35 and an inner washing pipe 36 coaxially sleeved with each other. A front end face of the inner washing pipe 36 is provided with a certain amount of retraction relative to a front end face of the outer washing pipe 35. A rear end part of the outer washing pipe 35 and a rear end part of the inner washing pipe 36 are respectively fixed on the washing tray 32, and are in the outer washing pipe 35 and the inner washing pipe 36. The inner hole part of the rear end of one of the washing pipes 35 or 36 is in communication with the negative pressure chamber on the washing tray, and the inner hole part of the rear end of the other washing pipe 35 or 36 is in communication with the outside air.

In the present embodiment, since a washing station 30 is provided after the stamping station 3 and before the adhesive dispensing station for the first adhesive component 4, the oil stain originally existing on the material strip 1 and the oil stain generated during the stamping process may be removed together at each adhesive dispensing position 10 by means of suction under negative pressure. Thus, the occurrence of weak adhesion between the adhesive and the core stamping sheet 45 due to the oil stain existing at the adhesive dispensing position 10 may be avoided, thereby improving the quality of adhesive dispensing lamination of the core stamping sheet 45.

In the present embodiment, a rubber sealing ring 37 is arranged on an end face of a front end of the outer washing pipe 35, and a negative pressure chamber 34 on the washing tray 32 is connected to a vacuumizing device 38 via a negative pressure pipeline. In the outer washing pipe 35 and the inner washing pipe 36, an air filter 29 surrounding the inner hole portion is arranged at the periphery of the inner hole portion at the rear end of the washing pipe 35 or 36 communicating with the outside air.

Preferably, the vacuumizing device 38 is a vacuum pump or a vacuum generator.

According to the working principle of the above-mentioned negative pressure washing device, after the material strip 1 moves to the washing station 30, the front ends of each outer washing pipe 35 located on the washing trays 32 above and below the material strip 1 respectively correspond to the adhesive dispensing positions on the material strip 1. Under the action of the vacuumizing device 38, external air is sucked into the inner washing pipe 36 after being filtered by the air filter 39 and enters the negative pressure chamber 34 of the washing tray 32 through the gap between the outer washing pipe 35 and the inner washing pipe 36, and is finally drawn out by the vacuumizing device 38. In this process, the oil stain at the adhesive dispensing position 10 on the material strip is carried away by the negative pressure air flow at the front end of the inner washing pipe 36 directly opposite to the adhesive dispensing position on the material strip 1, thereby achieving the function of desmearing the adhesive dispensing position 10 on the material strip 1.

In a further improvement, the inner hole of the rear end of the inner washing pipe 36 is also provided with a laser heating head 40 for non-contact local preheating of the surface of each adhesive dispensing position 10 on the material strip 1. The surface of each adhesive dispensing position 10 is cleaned by the above-mentioned negative pressure and locally preheated by a laser, and then the adhesive is dispensed, so as to further improve the curing speed and curing strength of the adhesive between the core stamping sheets 45.

By setting the laser intensity of the laser heating head 40 and the speed of the negative pressure air flow, it is possible to control the surface temperature at the adhesive dispensing position 10 on the material strip within a reasonable range set in advance, thereby preventing the temperature of the material strip 1 itself from being too low to affect the curing speed after the two adhesives are mixed.

Preferably, the preheating may be performed by the laser heating head 40 on only both sides of the material strip 1.

Preferably, only one side of the material strip 1 is preheated by the laser heating head 40, preferably the upper face of the material strip 1. It transfers heat for the mixed adhesive by the heat transfer effect during the core stamping sheet 45 lamination to increase the curing speed.

As a further improvement of the present embodiment, a hot air flow heating device 41 for performing auxiliary heating on the core stamping sheet 45 and the adhesive during lamination so as to achieve the accelerated curing of the adhesive is further arranged on the rotatable floating inductive jacking assembly 48 of the servo electric cylinder 18 of the servo pressure discharge system. The hot air flow heating device 41 includes a mounting hole axially arranged at the middle part of the upper end of the jacking tray 20 and a straight-handle heating fan 42 arranged in the mounting hole, and a hot air outlet of the straight-handle heating fan 42 is provided upwards. An air inlet channel 43 which is in communication with the mounting hole is arranged on a positioning shaft of the jacking tray 20. An air inlet annular groove 57 is arranged on the central positioning through-hole of the support seat ring 50. An outer edge surface of the support seat ring 50 is provided with an air inlet channel 43 which is in communication with the central positioning through-hole, and the air inlet channel of the support seat ring 50, the air inlet annular groove 57 of the support seat ring 50 and the air inlet channel 43 on the positioning shaft 59 of the jacking tray 20 are in communication successively. A plurality of hot air flow discharge ports 44 communicating with the inner holes of the tightening ring 17 are also circumferentially arranged at an upper end part of the tightening ring 17 of the automatic stacking die 16.

Preferably, the straight-handle heating fan 42 is a straight-handle electric blower.

In this embodiment, a guide pin 58 is arranged between the jacking tray 20 and the spring ring 52 to prevent relative rotation thereof.

In this embodiment, an elastic retainer ring 55 for limiting a distance of floating up and down of the jacking tray 20 is arranged on an outer circle of a lower end of the positioning shaft 59 of the jacking tray 20.

In the present embodiment, the straight-handle heating fan 42 is mounted in the mounting hole of the jacking tray 20 via a transition mounting sleeve 54 which is sleeved on the outer circle of the handle of the straight-handle heating fan 42.

In the present embodiment, a wiring hole is arranged at the lower end of the mounting hole of the jacking tray 20. A conductive slip ring 56 is arranged on the wiring hole. A wire outlet hole is arranged on the spring ring 52. A wire of the straight-handle heating fan 42 is led out to the outside through the conductive slip ring 56 and the wire outlet hole. A data wire of the displacement sensor 49 is led out to the outside through the wire outlet hole.

According to the working principle of the above-mentioned hot air flow heating device 41, before blanking, a straight-handle heating fan 42 on the hot air flow heating device 41 ejects a hot air flow upwards, and the hot air flow flows upwards through the inner hole of the core stamping sheet 45 in the tightening ring 17 and continues to ascend to the upper material strip 1 before blanking, so as to preheat the adhesive on the lower end surface of the material strip 1. In the blanking process, the core stamping sheet 45 on the material strip 1 enters the tightening ring 17 and forms a hot air flow collecting cavity with the original core stamping sheet 45 in the tightening ring 17, and the hot air flow in the cavity is discharged via the hot air flow discharge port 44 at the upper part of the tightening ring 17 and heats the inner hole of the core stamping sheet 45 and the cavity part, so that the catalyst and the main adhesive on the core stamping sheets 45 located at the upper and lower positions of the cavity are heated at the same time. After the blanking is completed, the heated catalyst and the main adhesive are in contact with each other and are pressed together, thereby directly heating the adhesive between the upper and lower adjacent core stamping sheets 45, thereby improving the curing speed of the adhesive. In addition, during the rise of the hot air flow, the core stamping sheet 17 within the tightening ring 45 is also simultaneously heated by the hot air flow to provide indirect heating of the adhesive. The hot air flow heating device 41 in the present embodiment has a dual heating effect of direct heating and indirect heating of the adhesive compared with the method of indirect heating of the adhesive using a magnetic induction heating core stamping sheet in the prior art, so that the heating rate of the adhesive is faster and the curing effect of the adhesive is better.

The laser heating head 40 and the hot air flow heating device 41 in the present embodiment may be used individually or may be used in combination according to the requirements of the adhesive strength of the core stamping sheet 45. They may also not be used when the ambient temperature is high or the bond strength requirements of the core stamping sheet 45 are relatively low.

In the present embodiment, according to the number of laminations of each group of cores, during the blanking process of the material strip 1, one piece of core stamping sheet is a adhesive-free core stamping sheet 45 without applying adhesive. When the adhesive-free core stamping sheet enters may separate two groups of stacked cores which are adjacent above and below when entering the tightening ring 17.

In the present embodiment, a core discharging pneumatic push rod 46 and a belt conveyor 47 are separately arranged on two sides of the servo electric cylinder 18. After a group of cores are stacked, the core which is seated on the jacking tray 20 is pushed onto the belt conveyor 47 by the core discharging pneumatic push rod 46, and then the core is conveyed to the equipment in the subsequent process by the belt conveyor 47.

Embodiment 2

An adhesive dispensing lamination process for a stator and rotor core of a motor includes the steps of:
(1) adhesive dispensing station setting: successively arranging a stamping station 3, an adhesive dispensing station for the first adhesive component 4, an adhesive dispensing station for the second adhesive component 5 and a blanking station 6 on the stamping progressive die 2 for the stator and rotor core of the motor according to the moving direction of a material strip. An automatic stacking mechanism 7 for core stamping sheets is arranged below the blanking station 6. One of the adhesive dispensing station for the first adhesive component 4 and the adhesive dispensing station for the second adhesive component 5 is located at an upper position of the material strip, and the other adhesive dispensing station is located at a lower position of the material strip 1. An adhesive dispensing device for the first adhesive component 8 for dispersing and dispensing a first adhesive component to one side of the material strip 1 is arranged at the adhesive dispensing station for the first adhesive component 4. An adhesive dispensing device for the second adhesive component 9 for dispersing and dispensing a second adhesive component to the other side of the material strip 1 is arranged at the adhesive dispensing station for the second adhesive component 5. Each adhesive dispensing position 10 arranged on one side of the material strip 1 by the adhesive dispensing device for the first adhesive component 8 and each adhesive dispensing position 10 arranged on the other side of the material strip 1 by the adhesive dispensing device for the second adhesive component 9 are arranged opposite to each other in an up-down direction. In the first adhesive component and the second adhesive component, the adhesive of one of the components is a main adhesive and the adhesive of the other component is a catalyst for promoting the curing of the main adhesive;
(2) stamping: moving the material strip 1 forwards in a stepwise manner on a stamping progressive die 2 of a stator and rotor core of a motor, and successively stamping a tooth groove, a through hole and an inner contour through a stamping die at each stamping station 3;
(3) dispensing: continuing to move the material strip forwards until reaching the adhesive dispensing station for the first adhesive component 4 and the adhesive dispensing station for the second adhesive component 5 successively, and performing dispensing of the first adhesive component and the second adhesive component on the upper and lower sides of the material strip 1 successively via the adhesive dispensing device for the first adhesive component 8 and the adhesive dispensing device for the second adhesive component 9;

(4) blanking: continuing to move the material strip 1 forwards to a blanking station 6, and then blanking the core stamping sheet 45 on the material strip 1 via a blanking die on the blanking station 6; and (5) stacking: under the action of the blanking die at the blanking station 6, pressing the core stamping sheet 5 into the tightening ring 17 below the blanking station 6, and overlapping two upper and lower adjacent core stamping sheets 45 into the tightening ring 17 together, so that the main adhesive and the catalyst between the two core stamping sheets 45 are quickly solidified due to mutual contact and pressing, thereby being laminated together;

wherein the stacking step of the stacking procedure of step (5) includes:

S1, initial setting of jacking tray positions: when the inside of the tightening ring 17 is empty, arranging the jacking tray 20 at a predetermined height position by adjusting the upper and lower positions of the telescopic rod 19 of the servo electric cylinder 18, wherein the predetermined height position of the jacking tray 20 needs to ensure that the jacking tray 20 is in elastic floating contact with the core stamping sheet after the first core stamping sheet blanks into the tightening ring 17;

S2, precise presetting of jacking tray positions: monitoring the distance between a lower end face of the jacking tray 20 and an upper end face of the spring ring 52 by a distance induction sensor 49 at an upper end of the telescopic rod 19 of the servo electric cylinder 18 after the first core stamping sheet blanks into the tightening ring 17, and then adjusting the upper and lower positions of the telescopic rod 19 of the servo electric cylinder 18, so that the distance between the lower end face 20 of the jacking tray and the upper end face of the spring ring 52 is exactly equal to the distance of the thickness of one core stamping sheet 45;

S3, transposition setting of the tightening ring: according to the equal division condition of the groove body or the hole on the core stamping sheet 45, rotating the tightening ring 17 by a certain equal division angle by means of rotary core lamination pressing die 16;

S4, blanking lamination: under the action of the punching pressure of the blanking die at the blanking station, extruding the core stamping sheet 45 to be blanked into the tightening ring 17 of the automatic stacking die 16 and to be in contact with the core stamping sheet 45 blanked previously in the tightening ring 17, so as to drive a lowermost core stamping sheet 45 in the tightening ring 17 to move downwards together; then synchronously pushing the jacking tray floatingly supported on the lowermost core stamping sheet 45 to move downwards, so that the lower end face of the jacking tray 20 is in contact with the upper end face of the spring ring 52, wherein the displacement amount passed when the jacking tray 20 moves downwards into contact with the spring ring 52 is just equal to the distance of the thickness of one core stamping sheet 45, so that the gap between two adjacent core stamping sheets 45 is eliminated, and accurate stacking is achieved; before the next blanking and stacking, based on the data measured by the distance induction sensor 49, actively moving the telescopic rod 19 of the servo electric cylinder 18 down by a distance of the thickness of the core stamping sheet 45; and at the same time, rotating the tightening ring 17 by a certain bisection angle by means of the rotary core lamination pressing die 16, so as to prepare for the next blanking and stacking.

As a further improvement of the adhesive dispensing lamination process of the stator and rotor core of the motor of the present embodiment, in the step (1) of setting a dispensing station, a washing station 30 is further arranged after the stamping station 3 and before the adhesive dispensing station for the first adhesive component 4 for cleaning the position of each adhesive dispensing position 10 on the material strip 1 before the dispensing operation. A negative pressure washing device 31 for cleaning the position of each adhesive dispensing position using a negative pressure adsorption principle is arranged on the washing station 30. A laser heating head 40 for performing non-contact local pre-heating on the surface of each adhesive dispensing position is further arranged on a negative pressure adsorption channel of the negative pressure washing device 31. A hot air flow heating device 41 for performing auxiliary heating on the core stamping sheet 45 and the adhesive in the lamination process so as to accelerate the curing of the adhesive is further arranged on a telescopic rod 19 of a servo electric cylinder 18 below the blanking station 6. After the stamping procedure of step (2) and before the adhesive dispensing procedure of step (3), cleaning and laser heating the position of each adhesive spot on the material strip 1 are performed by the negative pressure washing device 31 in advance, and then the adhesive dispensing operation of step (3) is performed. In the stacking procedure of step (5), the hot air flow heating device 41 is also activated to perform auxiliary heating on the core stamping sheet 45 and the adhesive during the stacking process so as to achieve accelerated curing of the adhesive.

The above mentioned are only preferred embodiments of the invention. It will be appreciated by those skilled in the art that some modifications and adaptations may be made without departing from the principle of the invention, and such modifications and alterations are intended to be included within the scope of the invention.

The invention claimed is:

1. A stamping progressive die for a stator and rotor core of a motor using adhesive dispensing lamination, comprising a stamping station, an adhesive dispensing station for a first adhesive component, an adhesive dispensing station for a second adhesive component and a blanking station which are successively arranged on the stamping progressive die for the stator and rotor core of the motor according to the moving direction of a material strip, wherein an automatic stacking mechanism for core stamping sheets is arranged below the blanking station; one of the adhesive dispensing station for the first adhesive component and the adhesive dispensing station for the second adhesive component is located at an upper position of the material strip, and the other adhesive dispensing station is located at a lower position of the material strip; wherein an adhesive dispensing device for the first adhesive component for dispersing and dispensing the first adhesive component to one side of the material strip is arranged at the adhesive dispensing station for the first adhesive component; an adhesive dispensing device for the second adhesive component for dispersing and dispensing the second adhesive component to the other side of the material strip is arranged at the adhesive dispensing station for the second adhesive component; each adhesive dispensing position arranged on one side of the material strip by the adhesive dispensing device for the first adhesive component and each adhesive dispensing position arranged on the other side of the material strip by the adhesive dispensing device for the second adhesive component are arranged opposite to each other in an up-down direction; wherein the automatic stacking mechanism for the core stamping sheets comprises an automatic stacking die which is a rotary core lamination pressing die; the rotary core lamination pressing die is provided with a tightening ring in an interference fit with an outer edge of the core stamping sheet, and the tightening ring is driven by a servo motor to realize that the rotation angle of the tightening ring is changeable; the automatic stacking mechanism for the core stamping sheets further comprises a servo pressure discharge system arranged below the automatic stacking die for applying a jacking force to the core in the rotary core lamination pressing die; the servo pressure discharge system comprises a servo electric cylinder arranged below the tightening ring, and a rotatable floating inductive jacking assembly arranged on an upper end of a telescopic rod of the servo electric cylinder; and the rotatable floating inductive jacking assembly comprises a jacking tray rotatably arranged on the telescopic rod of the servo electric cylinder and capable of floating up and down at a certain distance, and a displacement sensor for monitoring a floating up or down position of the jacking tray arranged on a telescopic rod of the servo electric cylinder and below the jacking tray.

2. The stamping progressive die for the stator and rotor core of the motor using adhesive dispensing lamination according to claim 1, wherein the first adhesive component is a main adhesive with a relatively high viscosity, and the second adhesive component is a catalyst with a relatively low viscosity; and the adhesive dispensing station for the first adhesive component as a main adhesive dispensing station is located on the stamping progressive die for the stator and rotor core of the motor at a position below the material strip; and the adhesive dispensing station for the second adhesive component as a catalyst dispensing station is located on the stamping progressive die for the stator and rotor core of the motor at a position above the material strip.

3. The stamping progressive die for the stator and rotor core of the motor using adhesive dispensing lamination according to claim 1, wherein the rotatable floating inductive jacking assembly further comprises a support seat ring fixed on an upper end of the telescopic rod of the servo electric cylinder and a central positioning through-hole arranged on the support seat ring; a positioning shaft is arranged at a lower end of the jacking tray, and the jacking tray is rotatably arranged on the central positioning through-hole of the support seat ring via the positioning shaft; a planar thrust bearing is arranged on an upper portion of the support seat ring; a spring ring is further sleeved on the positioning shaft of the jacking tray; the spring ring is located between a lower end surface of the jacking tray and an upper end surface of the planar thrust bearing; a compression spring for floating and tightening the jacking tray is arranged between the jacking tray and the spring ring; during the blanking, under the action of a blanking die at a blanking station, each core stamping sheet is successively extruded into the tightening ring of the automatic stacking die to achieve the lamination of each core stamping sheet, and the main adhesive and the catalyst located at each position point between upper and lower adjacent core stamping sheets in the tightening ring are in mutually facing contact, so that the main adhesive is accelerated to solidify, thereby bonding the upper and lower adjacent core stamping sheets firmly to form a core; and when the core stamping sheets are stacked, accurate stacking of the core stamping sheets is achieved by the servo pressure discharge system, thereby forming a core having a desired overall height dimension.

4. The stamping progressive die for the stator and rotor core of the motor using adhesive dispensing lamination according to claim 3, wherein the servo pressure discharge system achieves accurate lamination of the core stamping sheets, including the steps of:

S1, initial setting of jacking tray positions: when the inside of the tightening ring is empty, arranging the jacking tray at a predetermined height position by adjusting the upper and lower positions of the telescopic rod of the servo electric cylinder, wherein the predetermined height position of the jacking tray needs to ensure that the jacking tray is in elastic floating contact with the core stamping sheet after the first core stamping sheet blanks into the tightening ring;

S2, precise presetting of jacking tray positions: monitoring the distance between a lower end face of the jacking tray and an upper end face of the spring ring by a distance induction sensor at an upper end of the telescopic rod of the servo electric cylinder after the first core stamping sheet blanks into the tightening ring, and then adjusting the upper and lower positions of the telescopic rod of the servo electric cylinder, so that the distance between the lower end face of the jacking tray and the upper end face of the spring ring is exactly equal to the distance of the thickness of one core stamping sheet;

S3, transposition setting of the tightening ring: according to the equal division condition of the groove body or the hole on the core stamping sheet, rotating a rotary body containing the tightening ring by a certain equal division angle by means of a rotary core lamination pressing die; and S4, blanking lamination: under the action of the punching pressure of the blanking die at the blanking station, extruding the core stamping sheet to be blanked into the tightening ring of the automatic stacking die and to be in contact with the core stamping sheet blanked previously in the tightening ring, so as to drive a lowermost core stamping sheet in the tightening ring to move downwards together; synchronously pushing the jacking tray floatingly supported on the lowermost core stamping sheet to move downwards, so that the lower end face of the jacking tray is in contact with the upper end face of the spring ring, wherein the displacement amount passed when the jacking tray moves downwards into contact with the spring ring is just equal to the distance of the thickness of one core stamping sheet, so that the gap between two adjacent core stamping sheets is eliminated, and accurate lamination is achieved; before the next blanking and stacking, based on the data measured by the distance induction sensor, actively moving the telescopic rod of the servo electric cylinder down by a distance of the thickness of the core stamping sheet; and at the same time, rotating the rotary body containing the tightening ring by a certain bisection angle by means of the rotary core lamination pressing die, so as to prepare for the next blanking and stacking.

5. The stamping progressive die for the stator and rotor core of the motor using adhesive dispensing lamination according to claim 4, wherein a hot air flow heating device for performing auxiliary heating on the core stamping sheet and the adhesive during lamination so as to achieve the accelerated curing of the adhesive is further arranged on the rotatable floating inductive jacking assembly of the servo electric cylinder of the servo pressure discharge system, wherein the hot air flow heating device comprises a mounting hole axially arranged at the middle part of the upper end of the jacking tray and a straight-handle heating fan arranged in the mounting hole, and a hot air outlet of the straight-handle heating fan is provided upwards; an air inlet channel which is in communication with the mounting hole is arranged on a positioning shaft of the jacking tray; an air inlet annular groove is arranged on the central positioning through-hole of the support seat ring; an outer edge surface of the support seat ring is provided with an air inlet channel which is in communication with the central positioning through-hole, and the air inlet channel of the support seat ring, the air inlet annular groove of the support seat ring and the air inlet channel on the positioning shaft of the jacking tray are in communication successively; and a plurality of hot air flow discharge ports communicating with the inner holes of the tightening ring are also circumferentially arranged at an upper end part of the tightening ring of the automatic stacking die.

6. The stamping progressive die for the stator and rotor core of the motor using adhesive dispensing lamination according to claim 1, wherein the adhesive dispensing device for the first adhesive component and the adhesive dispensing device for the second adhesive component respectively comprise an adhesive dispensing tray and a number of adhesive dispensing nozzle bodies dispersedly arranged on the adhesive dispensing tray, wherein the adhesive dispensing nozzle bodies are provided with an adhesive feeding channel; one end of the adhesive feeding channel is an adhesive dispensing outlet, and the other end of the adhesive feeding channel is connected to an adhesive feeding pipe joint which is connected to an adhesive supply system via an adhesive feeding pipeline; the adhesive dispensing nozzle body is further provided with a washing channel; one end of the washing channel is in communication with the adhesive feeding channel, and one end of the washing channel is connected to a washing pipe joint which is connected to a cleaning liquid supply system via a washing pipeline; an adhesive solenoid valve is arranged on the adhesive feeding pipeline; and a cleaning liquid solenoid valve is arranged on the washing pipeline; wherein the adhesive supply system comprises a servo metering adhesive pump connected to the adhesive feeding pipeline.

7. The stamping progressive die for the stator and rotor core of the motor using adhesive dispensing lamination according to claim 1, wherein a washing station for washing the position of each adhesive dispensing position on the material strip before the adhesive dispensing operation is further arranged after the stamping station and before the adhesive dispensing station for the first adhesive component, and a negative pressure washing device for washing the position of each adhesive dispensing position using a negative pressure adsorption principle is arranged on the washing station; the negative pressure washing device comprises a washing tray and a plurality of washing pipe assemblies dispersedly arranged on the washing tray, wherein a negative pressure chamber is provided inside the washing tray; the washing pipe assemblies comprise an outer washing pipe and an inner washing pipe coaxially sleeved with each other; a front end face of the inner washing pipe is provided with a certain amount of retraction relative to a front end face of the outer washing pipe; a rear end part of the outer washing pipe and a rear end part of the inner washing pipe are respectively fixed on the washing tray, and are in the outer washing pipe and the inner washing pipe; and the inner hole part of the rear end of one of the washing pipes is in communication with the negative pressure chamber on the washing tray, and the inner hole part of the rear end of the other washing pipe is in communication with the outside air.

8. The stamping progressive die for the stator and rotor core of the motor using adhesive dispensing lamination according to claim 7, wherein a laser heating head for non-contact local preheating of the position surface of each adhesive dispensing position on the material strip is further arranged at the inner hole part of the rear end of the inner washing pipe; a rubber sealing ring is arranged on an end face of a front end of the outer washing pipe, and a negative pressure chamber on the washing tray is connected to a vacuumizing device via a negative pressure pipeline; and in the outer washing pipe and the inner washing pipe, an air filter surrounding the inner hole part is arranged at the periphery of the inner hole part at the rear end of the washing pipe communicating with the outside air.

9. An adhesive dispensing lamination process for a stator and rotor core of a motor, comprising the steps of:
    (1) adhesive dispensing station setting: successively arranging a stamping station, an adhesive dispensing station for a first adhesive component, an adhesive dispensing station for a second adhesive component and a blanking station on the stamping progressive die for the stator and rotor core of the motor according to the moving direction of a material strip, wherein an automatic stacking mechanism for core stamping sheets is arranged below the blanking station; one of the adhesive dispensing station for the first adhesive component and the adhesive dispensing station for the second adhesive component is located at an upper position of the material strip, and the other adhesive dispensing station is located at a lower position of the material strip; wherein an adhesive dispensing device for the first adhesive component for dispersing and dispensing the first adhesive component to one side of the material strip is arranged at the adhesive dispensing station for the first adhesive component; an adhesive dispensing device for the second adhesive component for dispersing and dispensing the second adhesive component to the other side of the material strip is arranged at the adhesive dispensing station for the second adhesive component; each adhesive dispensing position arranged on one side of the material strip by the adhesive dispensing device for the first adhesive component and each adhesive dispensing position arranged on the other side of the material strip by the adhesive dispensing device for the second adhesive component are arranged opposite to each other in an up-down direction; wherein, in the first adhesive component and the second adhesive component, the adhesive of one of the components is a main adhesive and the adhesive of the other component is a catalyst for promoting the curing of the main adhesive;
    (2) stamping: moving the material strip forwards in a stepwise manner on a stamping progressive die for a stator and rotor core of a motor, and successively stamping a tooth groove, a through hole and an inner contour through a stamping die at each stamping station;
    (3) dispensing: continuing to move the material strip forwards until reaching the adhesive dispensing station for the first adhesive component and the adhesive dispensing station for the second adhesive component successively, and performing dispensing of the first adhesive component and the second adhesive component on the upper and lower sides of the material strip successively via the adhesive dispensing device for the first adhesive component and the adhesive dispensing device for the second adhesive component;

(4) blanking: continuing to move the material strip forwards to a blanking station, and then blanking the core stamping sheet on the material strip via a blanking die on the blanking station; and (5) stacking: under the action of the blanking die at the blanking station, pressing the core stamping sheet into the tightening ring below the blanking station, and overlapping two upper and lower adjacent core stamping sheets into the tightening ring together, so that the main adhesive and the catalyst between the two core stamping sheets are quickly solidified due to mutual contact and pressing, thereby being laminated together;

wherein the stacking step of the stacking procedure of step (5) comprises:

S1, initial setting of jacking tray positions: when the inside of the tightening ring is empty, arranging the jacking tray at a predetermined height position by adjusting the upper and lower positions of the telescopic rod of the servo electric cylinder, wherein the predetermined height position of the jacking tray needs to ensure that the jacking tray is in elastic floating contact with the core stamping sheet after the first core stamping sheet blanks into the tightening ring;

S2, precise presetting of jacking tray positions: monitoring the distance between a lower end face of the jacking tray and an upper end face of the spring ring by a distance induction sensor at an upper end of the telescopic rod of the servo electric cylinder after the first core stamping sheet blanks into the tightening ring, and then adjusting the upper and lower positions of the telescopic rod of the servo electric cylinder, so that the distance between the lower end face of the jacking tray and the upper end face of the spring ring is exactly equal to the distance of the thickness of one core stamping sheet;

S3, transposition setting of the tightening ring: according to the equal division condition of the groove body or the hole on the core stamping sheet, rotating a rotary body containing the tightening ring by a certain equal division angle by means of a rotary core lamination pressing die; and S4, blanking lamination: under the action of the punching pressure of the blanking die at the blanking station, extruding the core stamping sheet to be blanked into the tightening ring of the automatic stacking die and to be in contact with the core stamping sheet blanked previously in the tightening ring, so as to drive a lowermost core stamping sheet in the tightening ring to move downwards together; synchronously pushing the jacking tray floatingly supported on the lowermost core stamping sheet to move downwards, so that the lower end face of the jacking tray is in contact with the upper end face of the spring ring, wherein the displacement amount passed when the jacking tray moves downwards into contact with the spring ring is just equal to the distance of the thickness of one core stamping sheet, so that the gap between two adjacent core stamping sheets is eliminated, and accurate lamination is achieved; before the next blanking and stacking, based on the data measured by the distance induction sensor, actively moving the telescopic rod of the servo electric cylinder down by a distance of the thickness of the core stamping sheet; and at the same time, rotating the rotary body containing the tightening ring by a certain bisection angle by means of the rotary core lamination pressing die, so as to prepare for the next blanking and stacking.

10. The adhesive dispensing lamination process for the stator and rotor core of the motor according to claim 9, wherein in the step (1) of setting a dispensing station, a washing station is further arranged after the stamping station and before the adhesive dispensing station for the first adhesive component for cleaning the position of each adhesive dispensing position on the material strip before the dispensing operation; a negative pressure washing device for cleaning the position of each adhesive dispensing position using a negative pressure adsorption principle is arranged on the washing station; a laser heating head for performing non-contact local pre-heating on the surface of each adhesive dispensing position is further arranged on a negative pressure adsorption channel of the negative pressure washing device; a hot air flow heating device for performing auxiliary heating on the core stamping sheet and the adhesive in the lamination process so as to accelerate the curing of the adhesive is further arranged on a telescopic rod of a servo electric cylinder below the blanking station; after the stamping procedure of step (2) and before the adhesive dispensing procedure of step (3), cleaning and laser heating the position of each adhesive spot on the material strip are performed by the negative pressure washing device in advance, and then the adhesive dispensing operation of step (3) is performed; in the stacking procedure of step (5), the hot air flow heating device is also activated to perform auxiliary heating on the core stamping sheet and the adhesive during the stacking process so as to achieve accelerated curing of the adhesive.

* * * * *